United States Patent
Kimura et al.

(10) Patent No.: US 9,040,681 B2
(45) Date of Patent: May 26, 2015

(54) METHOD FOR PRODUCING CATIONIZED CELLULOSE AND METHOD FOR PRODUCING CATIONIZED HYDROXYALKYL CELLULOSE

(75) Inventors: Akiyoshi Kimura, Wakayama (JP); Keiichiro Tomioka, Wakayama (JP); Toru Nishioka, Wakayama (JP); Kohei Nakanishi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 246 days.

(21) Appl. No.: 13/581,760

(22) PCT Filed: Feb. 28, 2011

(86) PCT No.: PCT/JP2011/054553
§ 371 (c)(1),
(2), (4) Date: Aug. 29, 2012

(87) PCT Pub. No.: WO2011/108505
PCT Pub. Date: Sep. 9, 2011

(65) Prior Publication Data
US 2013/0005957 A1   Jan. 3, 2013

(30) Foreign Application Priority Data

Mar. 2, 2010   (JP) ................................. 2010-045627

(51) Int. Cl.
| | | |
|---|---|---|
| *C08B 11/145* | (2006.01) | |
| *C08B 11/193* | (2006.01) | |
| *C08B 11/08* | (2006.01) | |
| *C08B 1/06* | (2006.01) | |
| *C08B 11/20* | (2006.01) | |

(52) U.S. Cl.
CPC ............... *C08B 11/08* (2013.01); *C08B 11/145* (2013.01); *C08B 1/06* (2013.01); *C08B 11/20* (2013.01)

(58) Field of Classification Search
CPC ...... C08B 11/193; C08B 11/145; C08B 11/20
USPC ........................................... 536/55.3, 43, 44
See application file for complete search history.

(56) References Cited

U.S. PATENT DOCUMENTS

| | | | |
|---|---|---|---|
| 2010/0105891 A1 | 4/2010 | Nojiri et al. | |
| 2010/0274001 A1 | 10/2010 | Okutsu et al. | |

FOREIGN PATENT DOCUMENTS

| | | |
|---|---|---|
| JP | 45 20318 | 7/1970 |
| JP | 53 90368 | 8/1978 |
| JP | 54 87786 | 7/1979 |
| JP | 54 87787 | 7/1979 |
| JP | 56 62801 | 5/1981 |
| JP | 60-177002 | 9/1985 |
| JP | 60 177002 | 9/1985 |
| JP | 62 132901 | 6/1987 |
| JP | 01138201 | 5/1989 |
| JP | 2002 114801 | 4/2002 |
| JP | 2002-114801 | 4/2002 |
| JP | 2002 226501 | 8/2002 |
| JP | 2009-102587 | 5/2009 |
| JP | 2009 161717 | 7/2009 |
| WO | 2009 054373 | 4/2009 |
| WO | WO 2012/091073 A1 | 7/2012 |

OTHER PUBLICATIONS

Mais et al., Applied Biochemistry and Biotechnology, 2002, Humana Press Inc., vol. 98-100, p. 815-832.*
The Extended European Search Report issued Nov. 13, 2013, in Application No. / Patent No. 11750615.4-1306 / 2543681 PCT/JP2011054553.
International Search Report Issued Mar. 29, 2011 in PCT/JP11/54553 Filed Feb. 28, 2011.

* cited by examiner

*Primary Examiner* — Jonathan S Lau
(74) *Attorney, Agent, or Firm* — Oblon, McClelland, Maier & Neustadt, L.L.P.

(57) ABSTRACT

A production method of a cationized cellulose or a cationized hydroxyalkylcellulose, including step 1 for adding a cationizing agent to cellulose and mechanically decrystallizing the cellulose and step 2 for adding a basic compound to the mixture obtained in step 1 and mechanically decrystallizing the cellulose, or a production method of a cationized cellulose or a cationized hydroxyalkylcellulose, including a step 3 for adding a basic compound to cellulose and mechanically decrystallizing the cellulose and step 4 for adding a cationizing agent to the mixture obtained in step 3 and mechanically decrystallizing the cellulose. The cellulose and the cationizing agent are allowed to react with each other in step 2 or step 4.

18 Claims, No Drawings

METHOD FOR PRODUCING CATIONIZED CELLULOSE AND METHOD FOR PRODUCING CATIONIZED HYDROXYALKYL CELLULOSE

TECHNICAL FIELD

The present invention relates to a production of cationized celluloses and cationized hydroxyalkylcelluloses which are useful as cationic cellulose derivatives.

BACKGROUND ART

Cationic cellulose derivatives are used for dispersants, modifiers, aggregating agents, etc. and are finding wide application. Since cellulose raw materials are highly crystalline and hardly undergo chemical reactions, an operation of reducing its crystallinity to increase its reactivity is need in the production of cationic cellulose derivatives. The method most generally employed is to convert cellulose to alkali cellulose by mixing cellulose with a large amount of water and a large excess of an alkali metal hydroxide in slurry state, i.e., by an activating treatment called ALCELL process or mercerization, and thereafter, allow the alkali cellulose to react with a cationizing agent, such as a glycidyltrialkylammonium chloride, or a hydroxyalkylating agent, such as an alkylene oxide, thereby converting to its derivative. In other known methods, cellulose is dissolved in a dimethylacetamide solvent containing lithium chloride in the presence of a catalyst, such as amine and tertiary alcoholate, and then converted to its derivative (for example, Patent Document 1), or cellulose is mechanochemically decrystallized in advance by using a ball mill, rod mill, etc. and then converted to its derivative (for example, Patent Document 2).

PRIOR ART DOCUMENT

Patent Documents

Patent Document 1: JP 60-177002A
Patent Document 2: JP 2009-102587A

SUMMARY OF THE INVENTION

The activation method by the ALCELL process uses a large excess of alkali. Therefore, an excess of alkali and reactants (particularly cationizing agent) often causes a side reaction to reduce the efficiency. In addition, the removal of a large amount of neutralization salt attributable to a large amount of alkali and a large amount of by-products is needed, this placing a large load on the production.

In the method described in Patent Document 1 wherein cellulose is dissolved in a specific solvent and then the reaction is allowed to proceed, a vast amount of solvent is needed, for example, an amount of at least ten times by mass as much as cellulose is needed, because the solubility of cellulose in the solvent is not sufficiently high. In addition, since lithium chloride is needed to be added in an amount nearly the same as that of cellulose, the product must be purified, this also placing a large load on the industrial production as in the method described above.

The method described in Patent Document 2 wherein cellulose is mechanochemically decrystallized in advance is a superior method which solves the problems in productivity and efficiency involved in the above method. However, if the resultant cationized cellulose derivative is applied to a use requiring a sufficiently high water solubility of the cationized cellulose derivative, cellulose nearly completely decrystallized should be used as a raw material. In addition, it has been found that the mechanochemical decrystallization of cellulose causes the break of the cellulose chain as the crystallinity is reduced, showing that a cationized cellulose having a high molecular weight and a high water-solubility is hardly obtained by this method.

An object of the invention is to provide a productive and efficient method of producing a highly water-soluble cationized cellulose and cationized hydroxyalkylcellulose while causing little molecular weight reduction.

Means for Solving the Problems

The inventors have found that a highly water-soluble cationized cellulose is produced by a production method, wherein the cellulose is allowed to react with a cationizing agent in the presence of a basic compound while preventing the reduction in the molecular weight of cellulose, if a mechanical decrystallization is conducted after adding each one of the cationizing agent and the basic compound to the cellulose. The inventors further found that a highly water-soluble cationized hydroxyalkylcellulose with little molecular weight reduction as compared with the cellulose is produced by allowing the cationized cellulose produced by the method mentioned above to react with an alkylene oxide in the presence of a basic compound.

Thus, the present invention relates to a method of producing a cationized cellulose, the method comprising step 1 and step 2, wherein cellulose is allowed to react with a cationizing agent represented by formula (1) in step 2:

step 1 wherein the cationizing agent represented by formula (1):

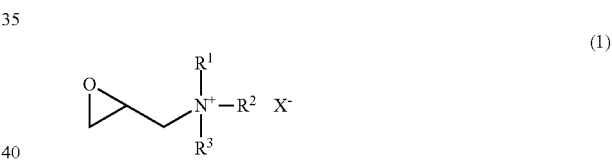

wherein each of $R^1$ to $R^3$ is independently a hydrocarbon group having 1 to 3 carbon atoms and $X^-$ is an anionic atom or group,
is added to the cellulose and the cellulose is mechanically decrystallized such that a reduction ($P^1$) in crystallinity in step 1 represented by calculation formula (1):

$$P^1 = \text{crystallinity (\%) of cellulose before starting step 1} - \text{crystallinity (\%) of cellulose after completing step 1} \quad (1)$$

reaches 1 to 60%, thereby obtaining a mixture, and step 2 wherein a basic compound is added to the mixture obtained in step 1 in an amount of 0.01 to 1 equiv per one mole of anhydroglucose unit of the cellulose in the mixture and the cellulose is mechanically decrystallized such that a reduction ($P^2$) in crystallinity in step 2 represented by calculation formula (2):

$$P^2 = \text{crystallinity (\%) of cellulose before starting step 2} - \text{crystallinity (\%) of cationized cellulose after completing step 2} \quad (2)$$

reaches 1 to 80%.

The present invention further related to a method of producing a cationized cellulose, the method comprising step 3 and step 4, wherein cellulose is allowed to react with a cationizing agent represented by the above formula (1) in step 4:

step 3 of adding a basic compound to cellulose in an amount of 0.01 to 1 equiv per one mole of anhydroglucose unit of the cellulose and mechanically decrystallizing the cellulose such that a reduction ($P^3$) in crystallinity in step 3 represented by calculation formula (3):

$$P^3 = \text{crystallinity (\%) of cellulose before starting step 3} - \text{crystallinity (\%) of cellulose after completing step 3} \quad (3)$$

reaches 1 to 60%, thereby obtaining a mixture, and step 4 of adding the cationizing agent represented by the above formula (1) to the mixture obtained in step 3 and mechanically decrystallizing the cellulose such that a reduction ($P^4$) in crystallinity in step 4 represented by calculation formula (4):

$$P^4 = \text{crystallinity (\%) of cellulose before starting step 4} - \text{crystallinity (\%) of cationized cellulose after completing step 4} \quad (4)$$

reaches 1 to 80%.

The present invention further relates to a method of producing a cationized hydroxyalkylcellulose, the method comprising:

producing a cationized cellulose by a method comprising step 1 and step 2, wherein cellulose is allowed to react with a cationizing agent represented by the above formula (1) in step 2; and allowing the cationized cellulose to react with an alkylene oxide having 2 to 4 carbon atoms:

step 1 of adding the cationizing agent represented by the above formula (1) to the cellulose and mechanically decrystallizing the cellulose such that a reduction ($P^1$) in crystallinity in step 1 represented by calculation formula (1):

$$P^1 = \text{crystallinity (\%) of cellulose before starting step 1} - \text{crystallinity (\%) of cellulose after completing step 1} \quad (1)$$

reaches 1 to 60%, thereby obtaining a mixture, step 2 of adding a basic compound to the mixture obtained in step 1 in an amount of 0.01 to 1 equiv per one mole of anhydroglucose unit of the cellulose in the mixture and mechanically decrystallizing the cellulose such that a reduction ($P^2$) in crystallinity in step 2 represented by calculation formula (2):

$$P^2 = \text{crystallinity (\%) of cellulose before starting step 2} - \text{crystallinity (\%) of cationized cellulose after completing step 2} \quad (2)$$

reaches 1 to 80%.

The present invention further relates to a method of producing a cationized hydroxyalkylcellulose, the method comprising:

producing a cationized cellulose by a method comprising step 3 and step 4, wherein cellulose is allowed to react with a cationizing agent represented by the above formula (1) in step 4; and allowing the cationized cellulose to react with an alkylene oxide having 2 to 4 carbon atoms:

step 3 of adding a basic compound to the cellulose in an amount of 0.01 to 1 equiv per one mole of anhydroglucose unit of the cellulose and mechanically decrystallizing the cellulose such that a reduction ($P^3$) in crystallinity in step 3 represented by calculation formula (3):

$$P^3 = \text{crystallinity (\%) of cellulose before starting step 3} - \text{crystallinity (\%) of cellulose after completing step 3} \quad (3)$$

reaches 1 to 60%, thereby obtaining a mixture, and step 4 of adding the cationizing agent represented by the above formula (1) to the mixture obtained in step 3 and mechanically decrystallizing the cellulose such that a reduction ($P^4$) in crystallinity in step 4 represented by calculation formula (4):

$$P^4 = \text{crystallinity (\%) of cellulose before starting step 4} - \text{crystallinity (\%) of cationized cellulose after completing step 4} \quad (4)$$

reaches 1 to 80%.

Effect of the Invention

According to the present invention, a productive and efficient method of producing a highly water-soluble cationized cellulose and cationized hydroxyalkylcellulose while causing little molecular weight reduction is provided.

MODE FOR CARRYING OUT THE INVENTION

The production method of a cationized cellulose (also referred to as "C-Cell") of the invention is a method of allowing cellulose to react with a cationizing agent in the presence of a basic compound, which is characterized by the mechanical decrystallization of the cellulose performed after adding one of the cationizing agent and the basic compound to the cellulose.

The production method of C-Cell of the invention includes two embodiments according to the order of adding the cationizing agent and the basic compound.

In a first embodiment of the production method of C-Cell, the cationizing agent is first added and then the basic compound is added. Namely, the first embodiment comprises the following steps 1 and 2 and the cellulose is allowed to react with the cationizing agent represented by formula (1) in step 2.

Step 1

In step 1, the cationizing agent represented by formula (1):

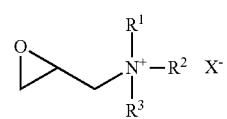

wherein each of $R^1$ to $R^3$ is independently a hydrocarbon group having 1 to 3 carbon atoms and $X^-$ is an anionic atom or group, is added to the cellulose and the cellulose is mechanically decrystallized such that the reduction ($P^1$) in crystallinity in step 1 is 1 to 60%. The reduction ($P^1$) is represented by calculation formula (1):

$$P^1 = \text{crystallinity (\%) of cellulose before starting step 1} - \text{crystallinity (\%) of cellulose after completing step 1} \quad (1).$$

Step 2

In step 2, the basic compound is added to the mixture obtained in step 1 in an amount of 0.01 to 1 equiv per one mole of anhydroglucose unit of the cellulose in the mixture and the cellulose is mechanically decrystallized such that the reduction ($P^2$) in crystallinity in step 2 is 1 to 80%. The reduction ($P^2$) is represented by calculation formula (2):

$$P^2 = \text{crystallinity (\%) of cellulose before starting step 2} - \text{crystallinity (\%) of C-Cell after completing step 2} \quad (2).$$

In a second embodiment of the production method of C-Cell, the basic compound is first added and then the cationizing agent is added. Namely, the second embodiment comprises the following steps 3 and 4 and the cellulose is allowed to react with the cationizing agent represented by formula (1) in step 4.

Step 3

In step 3, the basic compound is added to cellulose in an amount of 0.01 to 1 equiv per one mole of anhydroglucose unit of the cellulose and the cellulose is mechanically decrystallized such that the reduction ($P^3$) in crystallinity in step 3 is 1 to 60%. The reduction ($P^3$) is represented by formula (3):

$P^3$=crystallinity (%) of cellulose before starting step 3−crystallinity (%) of cellulose after completing step 3   (3).

Step 4

In step 4, the cationizing agent represented by formula (1) is added to the mixture obtained in step 3 and the cellulose is mechanically decrystallized such that the reduction ($P^4$) in crystallinity in step 4 is 1 to 80%. The reduction ($P^4$) is represented by formula (4):

$P^4$=crystallinity (%) of cellulose before starting step 4−crystallinity (%) of C-Cell after completing step 4   (4).

In view of the water solubility of C-Cell or the cationized hydroxyalkylcellulose (also referred to as "C-HAC"), C-Cell is preferably produced by the method of first embodiment.

The first embodiment and the second embodiment for the production of C-Cell are described below in detail separately.

First Embodiment of C-Cell Production

Cellulose

It has been generally known that cellulose takes several crystalline structures and its crystallinity is defined as the ratio between the amorphous regions and the crystalline regions. In the present invention, the crystallinity of cellulose is expressed by the crystallinity of I crystalline structure found in natural celluloses and determined by the substitution of the measured values of X-ray crystalline diffraction into calculation formula (5):

Crystallinity (%)=[($I_{22.6}$−$I_{18.5}$)/$I_{22.6}$]×100   (5)

wherein $I_{22.6}$ is a diffraction intensity of a lattice plane (002 plane) at a diffraction angle (2θ) of 22.6° and $I_{18.5}$ is a diffraction intensity of amorphous regions at a diffraction angle (2θ) of 18.5°, each measured by X-ray diffraction.

Pulp and cellulose generally known have amorphous regions in an extremely small amount and their crystallinities determined by calculation formula (5) fall within a range of about 60 to 90%.

The crystallinity of cellulose in which substantially all the crystalline regions are transformed to amorphous form by decrystallization can be a negative value in some cases, when calculated from calculation formula (5). In the present invention, such negative value is regarded as "0% crystallinity"

The crystallinity of the cellulose to be used in the invention (also referred to as "cellulose raw material") does not affect the operation of the production method of the invention and is not particularly limited. Since the reduction in molecular weight during the production is small, the production method of C-Cell or C-HAC of the invention is particularly effective for producing C-Cell or C-HAC having a high average degree of polymerization. Since the decrystallization of cellulose is accompanied by the reduction in the degree of polymerization due to the break of cellulose chains, a cellulose raw material with little reduction in the degree of polymerization having a higher crystallinity is preferably used. However, a cellulose raw material having an extremely high crystallinity, for example, a crystallinity exceeding 95% is hardly available. In view of the average degree of polymerization and easy availability, the crystallinity of the cellulose raw material is preferably 10 to 95%, more preferably 30 to 90%, and still more preferably 60 to 80%.

The average degree of polymerization referred to in the invention is a viscosity-average degree of polymerization determined by a cuprammonium method which is described below in detail in the example portion. The average degree of polymerization of the cellulose raw material also does not affect the operation of the production method of the invention and is not particularly limited. In view of obtaining C-Cell or C-HAC having a high average degree of polymerization, the average degree of polymerization of the cellulose raw material is preferably 100 or more and 3000 or less in view of easy availability, more preferably 200 to 2500, still more preferably 500 to 2200, and further more preferably 1000 to 2000.

The shape of the cellulose raw material is not particularly limited as long as it can be supplied to a production apparatus without difficulty. In view of easy operation, sheets of pulp, pellets or chips of pulp obtained by cutting or coarsely milling sheets of pulp, and powdery cellulose obtained by finely milling pulp are preferred, with chips of pulp being more preferred in view of maintaining the molecular weight of the cellulose high.

Step 1

Cationizing Agent

In formula (1) representing the cationizing agent (also referred to as merely "cationizing agent"), each of $R^1$ to $R^3$ is independently a hydrocarbon group having 1 to 3 carbon atoms.

Examples of the hydrocarbon group having 1 to 3 carbon atoms include methyl group, ethyl group, n-propyl group, and isopropyl group. In view of the water solubility of C-Cell or C-HAC to be obtained and the reactivity and easy availability of the cationizing agent, methyl group and ethyl group are preferred and methyl group is more preferred.

In formula (1), $X^-$ is an anionic atom or group, acting as a counter ion for the ammonium cation. Examples thereof include inorganic ion, such as halide ion, and organic ion, such as alkylsulfate ion and carboxylate ion, with halide ion and alkylsulfate ion having 1 to 3 carbon atoms being preferred in view of the easy availability and the water solubility of C-Cell or C-HAC to be obtained, and halide ion being more preferred in view of the water solubility. The halide ion includes fluoride ion, chloride ion, bromide ion, and iodide ion. In view of chemical stability and easy availability, chloride ion and bromide ion are preferred and chloride ion is more preferred.

Examples of the cationizing agent include chloride, bromide or mathylsulfate of each of glycidyltrimethylammonium, glycidyltriethylammonium, and glycidyltripropylammonium, with glycidyltrimethylammonium chloride being preferred from the above point of view.

The addition amount of the cationizing agent in step 1 is preferably 0.01 mol or more in view of the water solubility of C-Cell or C-HAC to be obtained and 5 mol or less in view of the efficiency of the cationizing agent, more preferably 0.03 to 3 mol from the same point of view, still more preferably 0.05 to 1.5 mol, and further more preferably 0.07 to 1.0 mol, each being based on one mole of the anhydroglucose unit constituting the cellulose raw material.

The manner for adding the cationizing agent is not particularly limited and the cationizing agent is added all at once, in several portions, continuously, or in combination thereof. In view of effectively dispersing the cationizing agent throughout the cellulose, the cationizing agent is preferably added continuously or in several portions while stirring the cellulose raw material. If the cationizing agent is added all at once, it is recommended to stir the mixture of the cellulose raw material and the cationizing agent so as to uniformly disperse the cationizing agent before the mechanical decrystallization.

The form of the cationizing agent to be added is also not particularly limited. Since the cationizing agent represented by formula (1) is liquid under normal conditions, the cationizing agent can be used directly or after diluting with a good solvent, such as water, to improve the handling ability by reducing the viscosity.

If an aqueous solution of the cationizing agent is used, it is preferable to regulate the water content in the aqueous solution of the cationizing agent such that the water content of the system after the addition is 5% by mass or more in view of efficiently dispersing the cationizing agent and 50% by mass or less in view of the efficiency of the mechanical decrystallization in step 1, each based on the amount of the cellulose raw material. From the same point of view, the aqueous solution of the cationizing agent is added such that the water content of the system after the addition is more preferably 8 to 30% by mass of the cellulose raw material.

The cationizing agent may be added to the cellulose raw material charged in an apparatus for the mechanical decrystallization. Alternatively, the cationizing agent may be added to the cellulose raw material charged in a different apparatus and then the resultant mixture obtained by stirring may be supplied to the apparatus for the mechanical decrystallization.

Examples of the different apparatus include a mixer capable of mixing the cellulose raw material, such as Lodige mixer, and a mixing machine for kneading resins as disclosed in JP 2002-114801A, paragraph 0016, such as kneader.

When adding to the cellulose raw material charged in the apparatus for the mechanical decrystallization, the cationizing agent may be added before or during the mechanical decrystallization.

Mechanical Decrystallization of Step 1

The mechanical decrystallization of step 1 is a treatment for milling cellulose by impact force, shearing force or pressure to reduce the crystallinity and is distinguished from a chemical treatment, such as dissolution or swelling using a solvent and ALCELL process using alkali. However, it should be noted that the influence of the heat and sound evolved or emitted by mechanical action on the decrystallization is not excluded and the mechanical decrystallization of the invention includes the decrystallization due to such heat and sound in addition to the decrystallization mainly due to mechanical force.

Examples of the apparatus for the mechanical decrystallization include roll mills, such as a high-pressure compression roll mill and a rotating roll mill; vertical roller mills, such as a ring roller mill, a roller-race mill, and a ball-race mill; tank-drive media mills, such as a tumbling ball mill, a vibration ball mill, a vibration rod mill, a vibration tube mill, a planetary ball mill, and a centrifugal fluid mill; media agitating mills, such as a tower mill, an agitating tank mill, a continuous tank mill, and an annular mill; consolidated shearing mills, such as a high-speed centrifugal roller mill and an angmill; a mortar; and a stone mill, with the tank-drive media mills and the media agitating mills being preferred in view of efficient reduction in the crystallinity and productivity, the tank-drive media mills being more preferred, and the vibration mills, such as a vibration ball mill, a vibration rod mill, and a vibration tube mill, being still more preferred.

The treatment may be conducted in either batchwise or continuous manner.

The material of the apparatus and/or media for the mechanical decrystallization is not particularly limited, and selected from, for example, iron, stainless steel, alumina, zirconia, silicone carbide, silicone nitride, and glass, with iron, stainless steel, zirconia, silicone carbide, and silicone nitride being preferred in view of efficient reduction in the crystallinity, and iron and stainless steel being more preferred in view of industrial use.

If a vibration mill with rod media is used, the outer diameter of rods is preferably 0.1 to 100 mm and more preferably 0.5 to 50 mm in view of efficient reduction in the crystallinity. If the size of rods is within the above range, the crystallinity is efficiently reduced to obtain a desired crystallinity The preferred filling rate of rod media varies depending upon the type of vibration mill and is preferably 10 to 97% and more preferably 15 to 95%. Within the above ranges, the contact between the cellulose and the rod media is increased and the moving of media is not disturbed to increase the milling efficiency. The filling rate referred to herein is a ratio of the apparent volume of rod media to the volume of milling tank of the vibration mill.

The preferred outer diameter and filling rate for ball media are the same as those of rod media mentioned above.

By the mechanical decrystallization in step 1, the crystallinity of the cellulose in the mixture is reduced. The reduction ($P^1$) in the crystallinity in step 1 is defined by calculation formula (1). In calculation formula (1), the crystallinity (%) of cellulose before starting step 1 is defined as the crystallinity which is calculated from calculation formula (5) by using the measured results of X-ray crystalline diffraction on the cellulose before adding the cationizing agent. The crystallinity (%) of cellulose after completing step 1 is defined as the crystallinity which is calculated from calculation formula (5) by using the measured results of X-ray crystalline diffraction on the mixture containing the cellulose after completing the mechanical decrystallization of step 1.

By conducting the mechanical decrystallization until the reduction ($P^1$) in the crystallinity reaches 1% or more, the water solubility of C-Cell or C-HAC to be obtained is good. If $P^1$ is 60% or less, the break of cellulose chains is prevented in step 1 and C-Cell or C-HAC is obtained with little reduction in the degree of polymerization of the cellulose raw material. From the same point of view, the mechanical decrystallization is conducted such that $P^1$ is regulated within a range preferably 3 to 50%, more preferably 5 to 30%, and still more preferably 5 to 20%.

The temperature for conducting the mechanical decrystallization is not particularly limited as long as it does not exceed the decomposition temperature of the cellulose or the cationizing agent, and industrially preferably −20 to 200° C., more preferably −10 to 100° C. in view of the water solubility of C-Cell or C-HAC, still more preferably 0 to 80° C., and further more preferably 10 to 60° C. If the temperature is raised by the heat evolved by the treatment to exceed the predetermined temperature, the cooling operation may be employed.

The treating time for the mechanical decrystallization may be suitably selected such that $P^1$ falls within the range specified above, and preferably 0.01 to 20 h, more preferably 0.05 to 10 h, and still more preferably 0.1 to 5 h.

In view of effectively reducing the crystallinity, the water content in the system during the mechanical decrystallization is regulated within a range preferably 5 to 50% by mass and more preferably 8 to 30% by mass, each based on the amount of the cellulose. If the water content becomes outside the above range, the water content may be regulated after or during the addition of the cationizing agent, for example, by a known method, such as addition of water or dehydration under reduced pressure.

Step 2

Basic Compound

Examples of the basic compound to be used in the invention include alkali metal hydroxides, such as sodium hydroxide, potassium hydroxide, and lithium hydroxide; alkaline earth metal hydroxides, such as magnesium hydroxide and calcium hydroxide; and tertiary amines, such as trimethylamine, triethylamine, and triethylenediamine, with the alkali metal hydroxides and/or the alkaline earth metal hydroxides being preferred, the alkali metal hydroxide being more preferred, and sodium hydroxide and potassium hydroxide being most preferred. These basic compounds may be used alone or in combination of two or more.

The basic compound may be added in any form. In view of uniform dispersion throughout the mixture obtained in step 1, the basic compound is preferably added in the form of an aqueous solution. The water content of the aqueous solution of the basic compound is preferably regulated such that the water content of the system after adding the aqueous solution is 5% by mass or more in view of the dispersion efficiency and 50% by mass or less in view of the efficiency of the mechanical decrystallization to be described below, each water content being based on the amount of the cellulose raw material used in step 1. From the same point of view, it is more preferred to regulate the water content of the aqueous solution of the basic compound such that the water content of the system after adding the aqueous solution is 8 to 30% by mass based on the amount of the cellulose raw material used in step 1.

If the water content of the system after adding the basic compound exceeds the above preferred range, the water content of the system can be regulated after or during the addition of the basic compound by a general method, for example, by dehydration under reduced pressure. However, in view of avoiding complicated operation and the water solubility of the resultant C-Cell or C-HAC, it is preferable to regulate the water content of the aqueous solution of the basic compound such that the water content of the system after adding the basic compound falls within the preferred range mentioned above.

If the addition amount of the basic compound is 0.01 equiv or more per one mole of the anhydroglucose unit in the cellulose raw material, the reaction between the cellulose and the cationizing agent proceeds quickly. If being one equivalent or less, the yield of the reaction between the cellulose and the cationizing agent is high. From the same point of view, the addition amount is preferably 0.02 to 0.7 equiv and more preferably 0.05 to 0.6 equiv, each based on one mole of the anhydroglucose unit in the cellulose raw material. In view of the water solubility of C-HAC to be obtained, the addition amount is still more preferably 0.1 to 0.6 equiv based on one mole of the anhydroglucose unit in the cellulose raw material.

The cationizing agent to be used in the invention generally contains a small amount of a halohydrin compound attributable to its industrial production method. For example, glycidyltrimethylammonium chloride contains about 1 to 2% of 3-chloro-2-hydroxypropyltrimethylammonium chloride. Since the halohydrin compound consumes the basic compound stoichiometrically, the addition amount of the basic compound is selected from the above range while taking the amount to be consumed by the halohydrin compound into consideration, thereby allowing the reaction with the cationizing agent, such as glycidyltrimethylammonium chloride, to proceed sufficiently.

The manner for adding the basic compound is not particularly limited and the basic compound is added all at once, in several portions, continuously, or in combination thereof. In view of uniform dispersion throughout the mixture obtained in step 1, the basic compound is preferably added continuously or in several portions while stirring the mixture. If the basic compound is added all at once, it is preferable to stir the mixture to uniformly disperse the basic compound before the mechanical decrystallization in step 2.

The basic compound may be added to the mixture charged in an apparatus for the mechanical decrystallization. Alternatively, the basic compound may be added to the mixture charged in a different apparatus and then the resultant mixture obtained by stirring may be supplied to the apparatus for the mechanical decrystallization. Examples of the different apparatus are the same as those, such as mixer and kneader, as mentioned with respect to step 1. When adding to the mixture charged in the apparatus for the mechanical decrystallization, the basic compound may be added before or during the mechanical decrystallization.

Mechanical Decrystallization in Step 2

The apparatus, the water content of the system, the temperature, and their preferred embodiments for the mechanical decrystallization in step 2 are the same as those of the mechanical decrystallization in step 1.

In the mechanical decrystallization of step 2, the reaction between the cellulose and the cationizing agent proceeds extremely efficiently together with the reduction in the crystallinity of the cellulose in the mixture, to form C-Cell.

The reduction ($P^2$) in the crystallinity in step 2 is defined by calculation formula (2). In calculation formula (2), the crystallinity (%) of cellulose before starting step 2 is defined as the crystallinity which is calculated from calculation formula (5) by using the measured results of X-ray crystalline diffraction on the mixture containing the cellulose before adding the basic compound. The crystallinity (%) of cationized cellulose after completing step 2 is defined as the crystallinity which is calculated from calculation formula (5) by using the measured results of X-ray crystalline diffraction on the mixture containing C-Cell after completing the mechanical decrystallization of step 2. By conducting the mechanical decrystallization until the reduction ($P^2$) in the crystallinity reaches 1% or more, the water solubility of C-Cell or C-HAC to be obtained is good. If $P^2$ is 80% or less, the break of cellulose chains is prevented in step 2 and C-Cell or C-HAC is obtained with little reduction in the degree of polymerization of the cellulose raw material. From the same point of view, the mechanical decrystallization is conducted such that $P^2$ is regulated within a range preferably 5 to 80%, more preferably 10 to 75%, still more preferably 20 to 70%, and further preferably 20 to 60%.

The treating time for the mechanical decrystallization may be suitably selected such that the reduction in the crystallinity falls within the range specified above, and preferably 0.01 to 28 h, more preferably 0.05 to 14 h, still more preferably 0.1 to 7 h, and further preferably 0.5 to 4 h.

Polyether

The decrystallization of step 1 and/or step 2 is preferably conducted in the presence of a polyether, because the milled cellulose particles or C-Cell particles are prevented from aggregating.

Particularly, these particles are likely to aggregate if the decrystallization is conducted in high water content to the cellulose raw material or relatively high temperature. Therefore, the effect of coexisting polyether is remarkable.

If the decrystallization is conducted in a media mill, such as a tank-drive media mill and a media agitating mill, the generation of metallic powder due to collision between milling media is prevented in the presence of polyether. This may be the effect of polyether to prevent the particle size from being made uneven due to the aggregation of cellulose particles or C-Cell particles, thereby preventing the direct collision between media.

The weight-average molecular weight of the polyether to be used in the invention is preferably 100 to 20000, more preferably 200 to 15000, and still more preferably 400 to 5000 in view of preventing the aggregation of cellulose particles or C-Cell particles. The weight-average molecular weight of the polyether is determined by gel permeation chromatography (GPC) using a calibration with a polyethylene glycol having a known molecular weight.

The polyether to be used in the invention is preferably polyalkylene glycol in view of preventing the aggregation of cellulose particles or C-Cell particles. Examples of the polyalkylene glycol include polyethylene glycol, polypropylene glycol, polybutylene glycol, polyoxyethyleneoxypropylene glycol, and polyoxyethyleneoxypropyleneoxybutylene glycol. These polyethers may be used alone or in combination of two or more.

In view of preventing the aggregation of particles and conducting the decrystallization efficiently, the addition amount of the polyether is preferably 0.1 to 100% by mass, more preferably 1 to 30% by mass, and still more preferably 2 to 20% by mass, each based on the cellulose raw material. In the invention, the term "addition amount of polyether (% by mass)" is the amount based on 100% by mass of the cellulose raw material (the same applies below).

The manner for adding the polyether is not particularly limited and the polyether is added all at once, in several portions, continuously, or in combination thereof.

If adding in step 1, the polyether may be added to the apparatus for the mechanical decrystallization. Alternatively, the polyether may be mixed with the cellulose in a different apparatus and then the resultant mixture obtained by stirring may be supplied to the apparatus for the mechanical decrystallization. The polyether may be added to the cellulose together with the cationizing agent or separately. If adding in step 2, similarly to the above, the polyether may be added to the apparatus for the mechanical decrystallization. Alternatively, the polyether may be pre-mixed with the decrystallized cellulose obtained in step 1 in a different apparatus and then the resultant mixture obtained by stirring may be supplied to the apparatus for the mechanical decrystallization. The polyether may be added to the cellulose together with the basic compound or separately.

The polyether may be separately added in both step 1 and step 2.

Of the above addition methods, preferred is a method of adding the polyether in step 2 to the apparatus for the mechanical decrystallization in view of preventing the aggregation of particles and conducting the decrystallization efficiently.

Aging

Although the reaction between the cellulose and the cationizing agent proceeds extremely efficiently during the mechanical decrystallization of step 2, the reaction product mixture may be aged, if necessary. The apparatus for aging is not particularly limited and the aging may be conducted in the apparatus used for the mechanical decrystallization, a mixing machine, such as a mixer and a kneader, described with respect to step 1, or a temperature-controllable vessel.

Aging Conditions

The aging temperature is preferably 20° C. or higher in view of the reaction rate and 200° C. or lower in view of preventing the decomposition of the raw materials. Thus, the aging temperature is preferably 20 to 200° C., more preferably 20 to 100° C., and still more preferably 30 to 80° C.

The aging time is suitably selected according to the amount of the cationizing agent, the content of the basic compound in the mixture, the water content, and the aging temperature, and generally 0.1 to 72 h, preferably 0.1 to 36 h, more preferably 0.1 to 18, and still more preferably 1 to 8.

The aging is preferably conducted in atmosphere of inert gas, such as nitrogen, if necessary, in view of preventing discoloration.

The water content of the system during the aging is preferably 5% by mass or more in view of the reaction rate and preferably 100% by mass or less in view of preventing excessive aggregation of C-Cell in the mixture, each content being based on the amount of cellulose raw material used in step 1. From these points of view, the water content of the system during the aging is preferably 10 to 60% by mass and more preferably 15 to 40% by mass, each based on the amount of the cellulose raw material.

If the water content of the system exceeds the above preferred range, for example, by adding the cationizing agent and/or the basic compound in the form of an aqueous solution, it is preferable to regulate the water content to the cellulose raw material within the above ranges by dehydration under reduced pressure.

If necessary, the cationizing agent represented by formula (1) may be additionally added during the aging. The additional cationizing agent and its preferred examples are the same as those mentioned above with respect to step 1. The additional cationizing agent may be the same as or different from that added in step 1.

The total of the amount of the additional cationizing agent and the amount of the cationizing agent added in step 1 is preferably 0.05 to 5 mol, more preferably 0.1 to 3 mol, still more preferably 0.2 to 1.5, and further preferably 0.3 to 0.8 mol, each being based on one mole of anhydroglucose unit constituting the cellulose raw material used in step 1, in view of the water solubility of C-Cell or C-HAC and efficient introduction of the cationizing agent.

The manner and form of adding the cationizing agent during the aging and their preferred embodiment are the same as those described with respect to step 1 except for the water content when added in the form of an aqueous solution. When adding in the form of an aqueous solution, the water content in the aqueous solution of the additional cationizing agent is preferably regulated such that the water content of the system after the addition falls within the above range of the water content of the system during the aging.

The aging may be conducted in the presence of a non-aqueous solvent in addition to water in view of easiness of stirring the mixture containing C-Cell.

Examples of the non-aqueous solvent include secondary or tertiary alcohols, such as isopropanol and tert-butanol, which are generally used in ALCELL process; ether solvents, for example, diglyme and triglyme, such as 1,4-dioxane, ethylene glycol dimethyl ether, and diethylene glycol dimethyl ether; and hydrophilic solvent, such as dimethyl sulfoxide, with dimethyl sulfoxide and isopropanol being preferred and dimethyl sulfoxide being more preferred because the solvent is inert to the reaction.

The amount of the non-aqueous solvent to be used is preferably 0 to 100% by mass, more preferably 0 to 60% by mass, and still more preferably 0 to 40% by mass, each being based on the amount of the cellulose raw material used in step 1.
Apparatus The aging may be conducted in the mixing machine, such as a mixer and a kneader, described with respect to step 1 or the apparatus used for the mechanical decrystallization of step 1 or 2.
Post Treatment C-Cell may be isolated from the mixture containing C-Cell, which is obtained in step 2 or obtained after the aging subsequent to step 2, after neutralization of the basic compound with a mineral acid or an organic acid and purification, for example, washing with a water-containing isopropanol or a water-containing acetone, if necessary.

If the reaction for adding an alkylene oxide having 2 to 4 carbon atoms to C-Cell (also referred to as "AO reaction"), which is described below, is conducted for obtaining C-HAC, AO reaction may be carried out directly while omitting the neutralization of the basic compound and the purification in view of simplifying the production process.

Second Embodiment of C-Cell Production

Cellulose

The crystallinity, average degree of polymerization, its shape, and their preferred embodiments of the cellulose to be used in the second embodiment of C-Cell production are the same as those described with respect to the first embodiment of C-Cell production.
Step 3
Basic Compound The kind, form, and their preferred embodiments of the basic compound to be used in step 3 are the same as those described with respect to step 2. When adding in the form of an aqueous solution, the water content of the aqueous solution of the basic compound is preferably regulated such that the water content of the system after adding the aqueous solution is 5% by mass or more in view of the dispersion efficiency and 50% by mass or less in view of the efficiency of the mechanical decrystallization to be described below, each water content being based on the amount of the cellulose raw material. From the same point of view, it is more preferred to regulate the water content of the aqueous solution of the basic compound such that the water content of the system after adding the aqueous solution is 8 to 30% by mass based on the amount of the cellulose raw material.

The addition amount, manner for addition, and timing of addition of the basic compound, apparatus, and their preferred embodiments are the same as those described with respect to step 2.
Mechanical Decrystallization of Step 3

The apparatus for the mechanical decrystallization, water content of the system, temperature, and their preferred embodiments to be employed in step 3 are the same as those employed in the mechanical decrystallization of step 1.

The reduction ($P^3$) in the crystallinity in step 3 is defined by calculation formula (3). In calculation formula (3), the crystallinity (%) of cellulose before starting step 3 is defined as the crystallinity which is calculated from calculation formula (5) by using the measured results of X-ray crystalline diffraction on the cellulose before adding the basic compound. The crystallinity (%) of cellulose after completing step 3 is defined as the crystallinity which is calculated from calculation formula (5) by using the measured results of X-ray crystalline diffraction on the mixture containing the cellulose after completing the mechanical decrystallization of step 3. By conducting the mechanical decrystallization until the reduction ($P^3$) in the crystallinity reaches 1% or more, the water solubility of C-Cell or C-HAC to be obtained is good. If $P^3$ is 60% or less, the break of cellulose chains is prevented in step 3 and C-Cell or C-HAC is obtained with little reduction in the degree of polymerization of the cellulose raw material. From the same point of view, the mechanical decrystallization is conducted such that $P^3$ is regulated within a range preferably 3 to 50%, more preferably 5 to 30%, and still more preferably 10 to 25%.

The treating time for the mechanical decrystallization and its preferred embodiment are the same as those described with respect to step 1.
Step 4
Cationizing Agent The kind, addition amount, manner of addition, form, and their preferred embodiments of the cationizing agent are the same as those described with respect to the cationizing agent in step 1.

If an aqueous solution of the cationizing agent is used, it is preferable to regulate the water content of the aqueous solution of the cationizing agent such that the water content of the system after the addition is 5% by mass or more in view of efficiently dispersing the cationizing agent and 50% by mass or less in view of the efficiency of the mechanical decrystallization in step 4, each based on the amount of the cellulose raw material. From the same point of view, the aqueous solution of the cationizing agent is preferably added such that the water content of the system after the addition is more preferably 8 to 30% by mass of the cellulose raw material.

It is preferable to regulate the water content of the aqueous solution of the cationizing agent such that the water content of the system after adding the cationizing agent falls within the above ranges even when the basic compound is added in the form of an aqueous solution in step 3. If the water content of the system exceeds the above preferred range, the water content of the system can be regulated before the mechanical decrystallization of step 4 to be described below by a general method, for example, by dehydration under reduced pressure. However, in view of avoiding complicated operation and the water solubility of the resultant C-Cell or C-HAC, it is preferable to regulate the water content of the aqueous solution of the cationizing agent such that the water content of the system after adding the cationizing agent falls within the preferred range mentioned above.

The timing of adding the cationizing agent, the apparatus, and their preferred embodiments are the same as those described with respect to the cationizing agent of step 1.
Mechanical Decrystallization of Step 4

The apparatus for the mechanical decrystallization, water content of the system, temperature, and their preferred embodiments to be employed in step 4 are the same as those employed in the mechanical decrystallization of step 2.

In the mechanical decrystallization of step 4, the reaction between the cellulose and the cationizing agent proceeds extremely efficiently together with the reduction in the crystallinity of the cellulose in the mixture, to form C-Cell.

The reduction ($P^4$) in the crystallinity in step 4 is defined by calculation formula (4). In calculation formula (4), the "crystallinity (%) of cellulose before starting step 4" is defined as the crystallinity which is calculated from calculation formula (5) by using the measured results of X-ray crystalline diffraction on the mixture containing the cellulose before adding the cationizing agent. The "crystallinity (%) of cationized cellulose after completing step 4" is defined as the crystallinity which is calculated from calculation formula (5) by using the measured results of X-ray crystalline diffraction on the mixture containing C-Cell after completing the mechanical decrystallization of step 4. By conducting the mechanical decrystallization until the reduction ($P^4$) in the crystallinity reaches 1% or more, the water solubility of C-Cell or C-HAC to be obtained is good. If $P^4$ is 80% or less, the break of cellulose chains is prevented in step 4 and C-Cell or C-HAC is obtained with little reduction in the degree of polymerization of the cellulose raw material. From the same point of view, the mechanical decrystallization is conducted such that $P^4$ is regulated within a range of preferably 5 to 80%, more preferably 10 to 75%, still more preferably 10 to 70%, and further preferably 20 to 30%.

The treating time for the mechanical decrystallization and its preferred embodiment are the same as those described with respect to step 2.

Polyether

The decrystallization of step 3 and/or step 4 is preferably conducted in the presence of a polyether, because cellulose or C-Cell particles are prevented from aggregating.

The kind, molecular weight, amount of use, manner of addition, timing of addition, and their preferred embodiments are the same as those employed in the decrystallization of step 1 and/or step 2 except for replacing "step 1" with "step 3 and "step 2" with "step 4."

Aging

The reaction between the cellulose and the cationizing agent proceeds extremely efficiently during the mechanical decrystallization of step 4. If the reaction between the cellulose the cationizing agent does not proceed sufficiently, the aging may be conducted, if necessary, after completing step 4. The apparatus for aging, aging temperature, the water content of the system, use of additional cationizing agent, amount of additional cationizing agent, kind and amount of non-aqueous solvent, and their preferred embodiments are the same as those described with respect to the aging in the first embodiment of C-Cell production except for replacing "step 1" with "step 3." The additional cationizing agent may be the same as or different from the cationizing agent added in step 4.

Post Treatment

C-Cell may be isolated from the mixture containing C-Cell, which is obtained in step 4 or obtained after the aging subsequent to step 4, after the neutralization of the basic compound with a mineral acid or an organic acid and the purification, for example, washing with a water-containing isopropanol or a water-containing acetone, if necessary.

If AO reaction to be described below is conducted for obtaining C-HAC, AO reaction may be carried out directly while omitting the neutralization of the basic compound and the purification in view of simplifying the production process.

Production of C-HAC

AO Reaction

C-HAC is obtained by allowing an alkylene oxide having 2 to 4 carbon atoms to react with C-Cell obtained in the present invention.

Alkylene Oxide

Examples of the alkylene oxide having 2 to 4 carbon atoms for use in AO reaction include ethylene oxide, propylene oxide, and butylene oxide, with ethylene oxide and propylene oxide being preferred in view of the properties of resultant C-HAC.

The amount of the alkylene oxide to be used is suitably selected according to the desired amount of the hydroxyalkyl group to be introduced, and preferably 0.1 to 12 mol, more preferably 0.5 to 10 mol, and still more preferably 1 to 7 mol, each based on one mole of the anhydroglucose unit constituting the main chain of C-Cell in view of the properties of resultant C-HAC.

The alkylene oxide may be added in the form of a solution in an organic solvent in view of easiness of operation. However, the alkylene oxide is gaseous or liquid under the conditions for AO reaction, it is preferable to add the alkylene oxide directly.

The alkylene oxide may be added in any manner of adding all at once, adding in several portions, adding continuously, or in combination thereof. In view of conducting the reaction in uniformly dispersed state of the alkylene oxide in C-Cell, the alkylene oxide is added preferably in several portions or continuously while stirring C-Cell.

Basic Compound

AO reaction is conducted preferably in the presence of a basic compound. The kind, amount of addition, form, manner of addition, and their preferred embodiments are the same as those described with respect to step 2.

The basic compound for use in AO reaction may be the same as or different from the basic compound added in step 2 or step 3.

If C-Cell produced in the present invention is directly subjected to AO reaction while omitting the post treatment: neutralization of the basic compound and purification, AO reaction can be conducted without freshly adding the basic compound.

AO Reaction Conditions

The reaction temperature, reaction time, water content, non-aqueous solution, and their preferred embodiments for AO reaction are the same as those described with respect to the aging of the C-Cell production method. The same applies to the apparatus for AO reaction. However, when ethylene oxide is used or propylene oxide is used and the reaction is conducted at relatively high temperature, it is preferable to use a highly hermetic, pressure-resistant apparatus to prevent the vaporization of these alkylene oxides.

After AO reaction, i.e., the reaction between C-Cell and the alkylene oxide, C-HAC is isolated, if necessary, through neutralization of the basic compound and purification, for example, washing with a water-containing propanol or a water-containing acetone.

Applications of C-Cell and C-HAC

According to the production method of the invention, C-Cell or C-HAC having high water solubility can be produced with little reduction in the degree of polymerization during the production. The obtained C-Cell or C-HAC is used in wide applications as polymeric surfactants, dispersants, emulsifiers, modifiers, aggregating agents, viscosity modifiers, etc.

EXAMPLES

In the following, "%" is based on mass unless otherwise noted. The details of the measuring methods used in the following examples are described below.

(1) Measurement of Water Content

The water contents of pulp and the mixtures obtained in steps 1 to 4 were determined by using an infrared moisture tester (tradename "FD-610" manufactured by Kett Electric Laboratory). The measurement was conducted at 120° C., and the point where the weight change with time for 30 s was 0.1% or less was taken as the end point of the measurement. The measured water content was converted to the water content (% by mass) based on the mass of the cellulose raw material used in step 1 or 3.

(2) Calculation of Crystallinity

Each sample of pulp and the mixtures obtained in steps 1 to 4 was measured for each intensity of X-ray diffraction under the following conditions by using "Rigaku RINT 2500VC X-RAY diffractometer" manufactured by Rigaku Corporation, and the crystallinity of cellulose in each sample was calculated from calculation formula (5).

Measuring Conditions

X-ray source: Cu/K$_\alpha$-radiation,
Tube voltage: 40 kV,
Tube current: 120 mA,
Measuring range: 2θ=5 to 45°, and
X-ray scan speed: 10°/min A compressed pellet having 320 mm$^2$ of surface area and 1 mm of thickness was used as the sample for measurement.

(3) Calculation of Amount of Introduced Groups

C-Cell and the cationized hydroxypropylcellulose (also referred to as "C-HPC") obtained in the following examples and comparative examples were measured for the molar amount of the cationic functional group which was introduced into C-Cell or C-HPC per one mole of anhydroglucose unit in the cellulose skeleton constituting the main chain of C-Cell or C-HPC (also referred to as "degree of substitution with cationic group") and the molar amount of propyleneoxy group which was introduced into C-HPC per one mole of anhydroglucose unit in the main chain of C-HPC (also referred to as "degree of substitution with propyleneoxy group"). Each degree of substitution was determined by the measured amount of chlorine obtained by elemental analysis and the value obtained by the method of analyzing hydroxypropylcellulose described in the Japanese Pharmacopoeia.

Specifically, C-Cell or C-HPC obtained in the examples was purified through a dialysis membrane (molecular weight cut-off of 1000), and the obtained aqueous solution was purified by freeze drying, to obtain a purified C-Cell (also simply referred to as "purified C-Cell") or a purified C-HPC (also simply referred to as "purified C-HPC"). The obtained purified C-Cell or purified C-HPC was measured for the chlorine content (%) by elemental analysis. Assuming that the number of the cationic groups in the purified C-Cell or purified C-HPC is nearly equal to the number of the chloride counter ions, the amount of cationic group (a (mol/g)) in unit mass of C-Cell or C-HPC was calculated from calculation formula (6):

$$a \text{ (mol/g)} = \text{chlorine content (\%) by elemental analysis}/(35.5 \times 100) \quad (6)$$

Separately, the content of hydroxypropoxy group (%) in the purified C-HPC was determined in accordance with "method of analyzing hydroxypropylcellulose" described in the Japanese Pharmacopoeia except for analyzing the purified C-HPC in place of hydroxypropylcellulose. The content (b (mol/g)) of hydroxypropoxy group (formula weight: —OC$_3$H$_6$OH=75.09) was calculated from calculation formula (7):

$$b \text{ (mol/g)} = \text{content of hydroxypropoxy group by gas chromatography (GC)}/(75.09 \times 100) \quad (7)$$

Using the obtained values a and b, the degree of substitution with cationic group k and the degree of substitution with propyleneoxy group m were calculated from calculation formulae (8) and (9):

$$a = k/(162 + k \times 152.5 + m \times 58) \quad (8)$$

$$b = m/(162 + k \times 152.5 + m \times 58) \quad (9)$$

wherein k is the degree of substitution with cationic group, and m is the degree of substitution with propyleneoxy group and zero for C-Cell.

(4) Measurement of Average Degree of Polymerization: Cuprammonium Method (4-1) Measurement of Average Degree of Polymerization of Cellulose Raw Material (i) Preparation of Solution for Measurement Into a volumetric flask (100 mL), 0.5 g of copper(I) chloride and 20 to 30 mL of a 25% ammonia water were added. After complete dissolution, 1.0 g of copper(II) hydroxide was added and the mixture was diluted with a 25% ammonia water to just below the mark of the volumetric flask. The resultant mixture was stirred for 30 to 40 min to a complete solution. After adding an amount of cellulose accurately weighed, the ammonia water was added to the mark of the volumetric flask. After sealing the flask air-tightly, the mixture was stirred with a magnetic stirrer for 12 h to obtain a solution.

The same procedure was repeated except for changing the amount of cellulose to be added in the range of 20 to 500 mg to prepare solutions for measurement with different concentrations.

(ii) Measurement of Viscosity-Average Degree of Polymerization

The solution for measurement (copper-ammonia aqueous solution) prepared in (i) was introduced into Ubbelohde viscometer, which was then allowed to stand in a controlled temperature bath (20±0.1° C.) for one hour. Then, the flow down speed of the solution was measured. Using the flow down speeds (t (s)) of copper-ammonia solutions with various cellulose concentrations (g/dL) and the flow down speed (t$_0$ (s)) of the copper-ammonia aqueous solution containing no cellulose, the reduced viscosity ($\eta_{sp}/c$) at each concentration was calculated from the following formula:

$$\eta_{sp}/c = \{(t-t_0)/t_0\}/c$$

wherein c is the cellulose concentration (g/dL).

Then, the intrinsic viscosity [η] (dL/g) was determined by extrapolating the reduced viscosity to c=0. The viscosity-average degree of polymerization (DP$_v$) was calculated from the following formula:

$$DP_v = 2000 \times [\eta]$$

wherein 2000 is the number specific to cellulose.

(4-2) Measurement of Average Degree of Polymerization of C-Cell (iii) Preparation of Solution for Measurement Each solution for measurement was prepared in the same manner as in the preparation (i) except for using an accurately weighed C-Cell in place of the accurately weighed cellulose.

(iv) Measurement of Average Degree of Polymerization

The measurement was conducted in the same manner as in the measurement (ii) of viscosity-average degree of polymerization except for expressing the concentration of the solution for measurement by a modified cellulose concentration (g/dL).

The modified cellulose concentration (C$_{cell}$) is the mass (g) of the cellulose skeleton in 1 dL of the solution for measurement and defined by calculation formula (10):

$$C_{cell} = u \times 162/(162 + k \times 152.5) \quad (10)$$

wherein u is the mass (g) of accurately weighed C-Cell used for preparing the solution for measurement, and k is the same as defined in calculation formulae (8) and (9).

(5) Calculation of Content of Water Solubles

A sample (purified C-Cell or purified C-HPC) (0.50 g) was weighed into a 50-mL screw tube. After adding 49.5 g of deionized water, the resultant mixture was stirred with a magnetic stirrer for 12 h to dissolve the sample. The resultant solution was introduced into a 50-ml centrifuge tube and centrifugally separated for 20 min at 3000 rpm (2000×g). The supernatant liquid (5 ml) was vacuum-dried (at 105° C. for 3 h) to determine the mass of the solid component. The content of water solubles was calculated from the following formula:

Content of water solubles (%)=(mass of solid component in 5 mL of supernatant liquid (g)×10/mass of sample)×100.

(6) Measurement of Median Size

The median size of C-Cell was measured by using a laser diffraction/scattering particle size distribution analyzer (tradename "LA-920" manufactured by Horiba Ltd.). The sample was prepared by ultrasonically treating C-Cell in a dispersion medium (ethanol) for one minute.

Example 1

Production of C-Cell by First Embodiment

A sheet-form wood pulp (manufactured by Tembec, average degree of polymerization: 1770, crystallinity: 74%, water content: 7.6%) as the cellulose raw material was made into chips by a sheet pelletizer (tradename "SGG-220" manufactured by Horai Co, Ltd.).

Step 1: Addition of Cationizing Agent and Mechanical Decrystallization

The obtained pulp chips (108 g) and 23.4 g (0.2 mol per one mole of anhydroglucose unit in cellulose (also referred to as "AGU")) of glycidyltrimethylammonium chloride (manufactured by Sakamoto Yakuhin Kogyo Co., Ltd. and also referred to as "GMAC") were mixed in a mortar. The water content of GMAC was 20% and its purity was 90% or more. The mixture was introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section. The mixture was decrystallized for 12 min under conditions of frequency: 20 Hz, total amplitude: 8 mm, and temperature: 30° C. or lower, to obtain 131 g of a powdery mixture of cellulose and GMAC (water content: 12.3% based on cellulose, average degree of polymerization: 1350, crystallinity: 68%).

Step 2: Addition of Basic Compound and Mechanical Decrystallization

The powdery mixture (131 g) obtained in step 1 and 20 g of a 24.7% aqueous solution of sodium hydroxide (0.2 mol per one mole of AGU) were mixed in a mortar. The mixture was introduced into a batch vibration mill (tradename "MB-1" manufactured by Chuo Kakohki Co., Ltd.) having a total tank volume of 3.5 L and containing 117 pieces of SUS304 rods (filling rate: 57%) with 10 mmϕ, 218 mm length, and a circular cross-section. The mixture was decrystallized for 60 min under conditions of frequency: 20 Hz, total amplitude: 8 mm, and temperature: 30° C. or lower, to obtain 151 g of a powdery mixture of C-Cell, GMAC, and sodium hydroxide (water content: 27.4% based on cellulose, average degree of polymerization: 1330, crystallinity: 45%).

Aging

The obtained powdery mixture (5 g) was aged in a screw tube at 50° C. for 5 h. The aged product was desalted and purified by neutralizing with acetic acid and washing with three portions of 100 ml of a 85% aqueous solution of isopropyl alcohol, and then vacuum-dried, to obtain 4 g of C-Cell (average degree of polymerization: 1330, crystallinity: 45%).

From the results of analysis, the calculated degree of substitution with cationic group was 0.1. The content of water solubles was 31%. The results are shown in Table 1.

Example 2

Production of C-Cell by First Embodiment

Aging

The powdery mixture (78.9 g) obtained after completing step 2 of Example 1 and 19.7 g (0.32 mol per one mole of AGU) of GMAC used in Example 1 were mixed in a mortar. The obtained mixture (water content: 37.2% based on cellulose) was introduced into a 1-L kneader equipped with a refluxing tube (tradename "PNV-1 Type" manufactured by Irie Shokai Co., Ltd.) and aged under nitrogen atmosphere for 5 h while heating the jacket of the kneader to 50° C. by warm water.

The aged product (5 g) was desalted and purified by neutralizing with acetic acid and washing with three portions of 100 ml of a 85% aqueous solution of isopropyl alcohol, and then vacuum-dried, to obtain 4 g of C-Cell (average degree of polymerization: 1330, crystallinity: 45%).

From the results of analysis, the calculated degree of substitution with cationic group was 0.3. The content of water solubles was 100%. The results are shown in Table 1.

Example 3

Production of C-Cell by First Embodiment

Step 1

The procedure of Example 1 was repeated up to step 1 to obtain 131 g of a powdery mixture of cellulose and GMAC (water content: 12.3% based on cellulose, average degree of polymerization: 1350, crystallinity: 68%).

Step 2

The powdery mixture (131 g) obtained in step 1 and 22 g of a 31.4% aqueous solution of potassium hydroxide (0.2 mol per one mole of AGU) were mixed in a mortar. The resultant mixture was introduced into the batch vibration mill used in Example 1 and decrystallized under the same conditions as employed in step 2 of Example 1, to obtain 153 g of a powdery mixture of C-Cell, GMAC, and potassium hydroxide (water content: 27.4% based on cellulose, average degree of polymerization: 1120, crystallinity: 48%).

Aging

The obtained powdery mixture (78.9 g) and 19.7 g (0.32 mol per one mole of AGU) of GMAC used in Example 1 were mixed in a mortar. The obtained mixture (water content: 37.2% based on cellulose) was introduced into a 1-L kneader equipped with a refluxing tube (tradename "PNV-1 Type" manufactured by Irie Shokai Co., Ltd.) and aged under nitrogen atmosphere for 5 h while heating the jacket of the kneader to 50° C. by warm water.

The aged product (5 g) was desalted and purified by neutralizing with acetic acid and washing with three portions of 100 ml of a 85% aqueous solution of isopropyl alcohol, and then vacuum-dried, to obtain 4 g of C-Cell (average degree of polymerization: 1120, crystallinity: 44%).

From the results of analysis, the calculated degree of substitution with cationic group was 0.3. The content of water solubles was 84%. The results are shown in Table 1.

Example 4

Production of C-Cell by First Embodiment

Step 1

The procedure of Example 1 was repeated up to step 1 except for changing the addition amount of GMAC to 0.1 mol per one mole of AGU, to obtain 119 g of a powdery mixture of cellulose and GMAC (water content: 12.3% based on cellulose, average degree of polymerization: 1330, crystallinity: 68%).

Step 2

The powdery mixture (119 g) obtained in step 1 and 17 g of a 14.4% aqueous solution of sodium hydroxide (0.1 mol per one mole of AGU) were mixed in a mortar. The resultant mixture was introduced into the batch vibration mill used in Example 1 and decrystallized under the same conditions as employed in step 2 of Example 1, to obtain 136 g of a powdery mixture of C-Cell, GMAC, and sodium hydroxide (water content: 27.4% based on cellulose, average degree of polymerization: 1020, crystallinity: 41%).

Aging

The obtained powdery mixture (100 g) and 35.3 g (0.42 mol per one mole of AGU) of GMAC used in Example 1 were mixed in a mortar. The obtained mixture (water content: 37.2% based on cellulose) was introduced into a 1-L kneader equipped with a refluxing tube (tradename "PNV-1 Type" manufactured by Irie Shokai Co., Ltd.) and aged under nitrogen atmosphere for 5 h while heating the jacket of the kneader to 50° C. by warm water.

The aged product (5 g) was desalted and purified by neutralizing with acetic acid and washing with three portions of 100 ml of a 85% aqueous solution of isopropyl alcohol, and then vacuum-dried, to obtain 4 g of C-Cell (average degree of polymerization: 1020, crystallinity: 41%).

From the results of analysis, the calculated degree of substitution with cationic group was 0.3. The content of water solubles was 93%. The results are shown in Table 1.

Example 5

Production of C-Cell by First Embodiment

In the same manner as in Example 1, a sheet-form wood pulp (manufactured by Tembec, average degree of polymerization: 1770, crystallinity: 74%, water content: 7.6%) was made into chips by a sheet pelletizer.

Step 1

The obtained pulp chips (98 g) and 54.3 g (0.5 mol per one mole of AGU) of GMAC used in Example 1 were mixed in a mortar. The mixture was introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section. The mixture was decrystallized for 60 min under conditions of frequency: 20 Hz, total amplitude: 8 mm, and temperature: 30° C. or lower, to obtain 152 g of a powdery mixture of cellulose and GMAC (water content: 22.3% based on cellulose, average degree of polymerization: 1300, crystallinity: 61%).

Step 2

The powdery mixture (152 g) obtained in step 1 and 9 g of a 48% aqueous solution of sodium hydroxide (0.2 mol per one mole of AGU) were mixed and introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section. The mixture was decrystallized for 60 min under conditions of frequency: 20 Hz, total amplitude: 8 mm, and temperature: 30° C. or lower, to obtain 161 g of a powdery mixture of C-Cell, GMAC, and sodium hydroxide (water content: 37.2% based on cellulose, average degree of polymerization: 1240, crystallinity: 38%).

Post Treatment

The powdery mixture (5 g) obtained in step 2 was desalted and purified by neutralizing with acetic acid and washing with three portions of 100 ml of a 85% aqueous solution of isopropyl alcohol, and then vacuum-dried, to obtain 4 g C-Cell (average degree of polymerization: 1240, crystallinity: 38%).

From the results of analysis, the calculated degree of substitution with cationic group was 0.3. The content of water solubles was 98%. The results are shown in Table 1.

Example 6

Production of C-Cell by First Embodiment

Step 1

The procedure of Example 5 was repeated up to step 1 to obtain 152 g of a powdery mixture of cellulose and GMAC (water content: 22.3% based on cellulose, average degree of polymerization: 1300, crystallinity: 61%).

Step 2

The powdery mixture (152 g) obtained in step 1 and 18 g of a 48% aqueous solution of sodium hydroxide (0.4 mol per one mole of AGU) were mixed and introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section. The mixture was decrystallized for 120 min under conditions of frequency: 20 Hz, total amplitude: 8 mm, and temperature: 30° C. or lower, to obtain 170 g of a powdery mixture of C-Cell, GMAC, and sodium hydroxide (water content: 32.7% based on cellulose, average degree of polymerization: 860, crystallinity: 14%).

Post Treatment

The powdery mixture (5 g) obtained in step 2 was desalted and purified by neutralizing with acetic acid and washing with three portions of 100 ml of a 85% aqueous solution of isopropyl alcohol, and then vacuum-dried, to obtain 4 g C-Cell (average degree of polymerization: 860, crystallinity: 14%).

From the results of analysis, the calculated degree of substitution with cationic group was 0.3. The content of water solubles was 93%. The results are shown in Table 1.

Example 7

Production of C-Cell by First Embodiment

Step 1

The procedure of Example 5 was repeated up to step 1 to obtain 152 g of a powdery mixture of cellulose and GMAC (water content: 22.3% based on cellulose, average degree of polymerization: 1300, crystallinity: 61%).

Step 2

The powdery mixture (152 g) obtained in step 1 and 23 g of an aqueous solution of sodium hydroxide (13 g of sodium hydroxide in 10 g of water; 0.6 mol per one mole of AGU) were mixed and introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section. The mixture was decrystallized for 120 min under conditions of frequency: 20 Hz, total amplitude: 8 mm, and temperature: 30° C. or lower, to obtain 175 g of a powdery mixture of C-Cell, GMAC, and sodium hydroxide (water content: 32.7% based on cellulose, average degree of polymerization: 809, crystallinity: 9%).

Post Treatment

The powdery mixture (5 g) obtained in step 2 was desalted and purified by neutralizing with acetic acid and washing with three portions of 100 ml of a 85% aqueous solution of isopropyl alcohol, and then vacuum-dried, to obtain 4 g C-Cell (average degree of polymerization: 809, crystallinity: 9%).

From the results of analysis, the calculated degree of substitution with cationic group was 0.3. The content of water solubles was 81%. The results are shown in Table 1.

Example 8

Production of C-Cell by First Embodiment

In the same manner as in Example 1, a sheet-form wood pulp (manufactured by Tembec, average degree of polymerization: 1770, crystallinity: 74%, water content: 7%) was made into chips by a sheet pelletizer.

Step 1

In the same manner as in step 1 of Example 1 except for using 54.3 g (0.5 mol per one mole of AGU) of GMAC used in Example 1, a powdery mixture of cellulose and GMAC (water content: 22.3% based on cellulose, average degree of polymerization: 1350, crystallinity: 68%) was obtained.

Step 2

After step 1, 20.1 g of a 48% aqueous solution of sodium hydroxide (0.4 mol per one mole of AGU) was further introduced into the batch vibration mill (tradename "MB-1" manufactured by Chuo Kakohki Co., Ltd.) having a total tank volume of 3.5 L and containing 13 pieces of SUS304 rods (filling rate: 57%) with 30 mm$\phi$, 218 mm length, and a circular cross-section and the decrystallization was carried out for 20 min under conditions of frequency: 20 Hz, total amplitude: 8 mm, and temperature: 50° C. or lower, to obtain a powdery mixture of C-Cell, GMAC, and sodium hydroxide. Then, 10 g (10% by mass of the cellulose raw material used in step 1) of polyethylene glycol (tradename "polyethylene glycol 600" (PEG600) manufactured by Wako Pure Chemical Industries, Ltd.; weight average molecular weight: 600) was further introduced into the batch vibration mill (tradename "MB-1" manufactured by Chuo Kakohki Co., Ltd.) having a total tank volume of 3.5 L and containing 13 pieces of SUS304 rods (filling rate: 57%) with 30 mm$\phi$, 218 mm length, and a circular cross-section. The resultant mixture was decrystallized and atomized for 120 min under conditions of frequency: 20 Hz, total amplitude: 8 mm, and temperature: 50° C. or lower, to obtain a powdery mixture of C-Cell, GMAC, PEG600, and sodium hydroxide (water content: 32.5% based on cellulose, average degree of polymerization: 1006, crystallinity: 22%, median size: 65 μm).

Post Treatment

The powdery mixture (5 g) obtained in step 2 was desalted and purified by neutralizing with acetic acid and washing with three portions of 100 ml of a 85% aqueous solution of isopropyl alcohol, and then vacuum-dried, to obtain 4 g C-Cell (average degree of polymerization: 1006, crystallinity: 22%).

From the results of analysis, the calculated degree of substitution with cationic group was 0.3. The content of water solubles was 81%. The results are shown in Table 1.

Example 9

Production of C-Cell by First Embodiment

Step 1

The procedure of Example 8 was repeated up to step 1 to obtain a powdery mixture of cellulose and GMAC (water content: 22.3% based on cellulose, average degree of polymerization: 1350, crystallinity: 68%).

Step 2

After step 1, 20.1 g of a 48% aqueous solution of sodium hydroxide (0.4 mol per one mole of AGU) was further introduced into the batch vibration mill (tradename "MB-1" manufactured by Chuo Kakohki Co., Ltd.) having a total tank volume of 3.5 L and containing 13 pieces of SUS304 rods (filling rate: 57%) with 30 mm$\phi$, 218 mm length, and a circular cross-section and the decrystallization was carried out for 20 min under conditions of frequency: 20 Hz, total amplitude: 8 mm, and temperature: 50° C. or lower, to obtain a powdery mixture of C-Cell, GMAC, and sodium hydroxide. Then, 10 g (10% by mass of the cellulose raw material used in step 1) of polyethylene glycol (tradename "polyethylene glycol 4000" (PEG4000) manufactured by Wako Pure Chemical Industries, Ltd.; weight average molecular weight: 4000) was further introduced into the batch vibration mill (tradename "MB-1" manufactured by Chuo Kakohki Co., Ltd.) having a total tank volume of 3.5 L and containing 13 pieces of SUS304 rods (filling rate: 57%) with 30 mm$\phi$, 218 mm length, and a circular cross-section. The resultant mixture was decrystallized and atomized for 120 min under conditions of frequency: 20 Hz, total amplitude: 8 mm, and temperature: 50° C. or lower, to obtain a powdery mixture of C-Cell, GMAC, sodium hydroxide, and PEG4000 (water content: 32.5% based on cellulose, average degree of polymerization: 1061, crystallinity: 30%, median size: 74 μm).

Post Treatment

The powdery mixture (5 g) obtained in step 2 was desalted and purified by neutralizing with acetic acid and washing with three portions of 100 ml of a 85% aqueous solution of isopropyl alcohol, and then vacuum-dried, to obtain 4 g C-Cell (average degree of polymerization: 1061, crystallinity: 30%).

From the results of analysis, the calculated degree of substitution with cationic group was 0.3. The content of water solubles was 79%. The results are shown in Table 1.

Example 10

Production of C-Cell by First Embodiment

In the same manner as in Example 1, a sheet-form wood pulp (manufactured by Tembec, average degree of polymerization: 1770, crystallinity: 74%, water content: 8.5%) was made into chips by a sheet pelletizer.

Step 1

The obtained pulp chips (2.1 kg) and 1.2 kg (0.5 mol per one mole of AGU) of GMAC used in Example 1 were mixed in a bag. The resultant mixture was introduced into a batch vibration mill (tradename "FV-20" manufactured by Chuo Kakohki Co., Ltd.) having a total tank volume of 68.9 L and containing 114 pieces of SUS304 rods (filling rate: 70%) with 30 mm$\phi$, 590 mm length, and a circular cross-section and decrystallized for 12 min under conditions of frequency: 20 Hz, total amplitude: 8 mm, and temperature: 30° C. or lower, to obtain a powdery mixture of cellulose and GMAC (water content: 22.3% based on cellulose, average degree of polymerization: 1350, crystallinity: 68%).

Step 2

After step 1, 0.385 kg of a 48% aqueous solution of sodium hydroxide (0.4 mol per one mole of AGU) was further introduced into the batch vibration mill (tradename "FV-20" manufactured by Chuo Kakohki Co., Ltd.) having a total tank volume of 68.9 L and containing 114 pieces of SUS304 rods (filling rate: 70%) with 30 mmϕ, 590 mm length, and a circular cross-section. Then the decrystallization was carried out for 20 min under conditions of frequency: 20 Hz, total amplitude: 8 mm, and temperature: 50° C. or lower, to obtain a powdery mixture of C-Cell, GMAC, and sodium hydroxide. Then, 0.192 kg (10% by mass of the cellulose raw material used in step 1) of polypropylene glycol (tradename "polypropylene glycol diol type, average molecular weight: 1000" (PPG1000) manufactured by Wako Pure Chemical Industries, Ltd.; weight average molecular weight: 1000) was further introduced into the batch vibration mill (tradename "FV-20" manufactured by Chuo Kakohki Co., Ltd.) having a total tank volume of 68.9 L and containing 114 pieces of SUS304 rods (filling rate: 70%) with 30 mmϕ, 590 mm length, and a circular cross-section. Then, the decrystallization was carried out for 160 min under conditions of frequency: 20 Hz, total amplitude: 8 mm, and temperature: 50° C. or lower, to obtain a powdery mixture of C-Cell, GMAC, sodium hydroxide, and PPG1000 (water content: 32.5% based on cellulose, average degree of polymerization: 829, crystallinity: 14%, median size: 100 μm).

Post Treatment

The powdery mixture (5 g) obtained in step 2 was desalted and purified by neutralizing with acetic acid and washing with three portions of 100 ml of a 85% aqueous solution of isopropyl alcohol, and then vacuum-dried, to obtain 4 g C-Cell (average degree of polymerization: 829, crystallinity: 14%).

From the results of analysis, the calculated degree of substitution with cationic group was 0.2. The content of water solubles was 81%. The results are shown in Table 1.

Example 11

Production of C-Cell by Second Embodiment

In the same manner as in Example 1, a sheet-form wood pulp (manufactured by Tembec, average degree of polymerization: 1770, crystallinity: 74%, water content: 8.0%) was made into chips by a sheet pelletizer.

Step 3: Addition of Basic Compound and Mechanical Decrystallization

The obtained pulp chips (108 g), 4.5 g (0.2 mol per one mole of AGU) of powdery sodium hydroxide, and 4.9 g of deionized water were mixed in a mortar. The resultant mixture was introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section and decrystallized for 12 min under conditions of frequency: 20 Hz, total amplitude: 8 mm, and temperature: 30° C. or lower, to obtain 117 g of a powdery mixture of cellulose and sodium hydroxide (water content: 12.8% based on cellulose, average degree of polymerization: 1500, crystallinity: 60%).

Step 4: Addition of Cationizing Agent and Mechanical Decrystallization

The powdery mixture (117 g) obtained in step 3 and 21.5 g (0.2 mol per one mole of AGU) of GMAC used in Example 1 were introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section and decrystallized for 60 min under conditions of frequency: 20 Hz, total amplitude: 8 mm, and temperature: 30° C. or lower, to obtain 138 g of a powdery mixture of C-Cell, GMAC, and sodium hydroxide (water content: 18.7% based on cellulose, average degree of polymerization: 1100, crystallinity: 38%).

Aging

The obtained powdery mixture (100 g) and 24.8 g (0.3 mol per one mole of AGU) of GMAC used in Example 1 were mixed in a mortar. The obtained mixture (water content: 34.8% based on cellulose) was introduced into a kneader and aged at 50° C. for 5 h. The aged product (10 g) was desalted and purified by neutralizing with acetic acid and washing with three portions of 100 ml of a 85% aqueous solution of isopropyl alcohol, and then vacuum-dried, to obtain 7 g of C-Cell (average degree of polymerization: 1100, crystallinity: 38%).

From the results of analysis, the calculated degree of substitution with cationic group was 0.3. The content of water solubles was 81%. The results are shown in Table 2.

Example 12

Production of C-Cell by Second Embodiment

In the same manner as in Example 1, a sheet-form wood pulp (manufactured by Tembec, average degree of polymerization: 1770, crystallinity: 74%, water content: 8.0%) was made into chips by a sheet pelletizer.

Step 3

The obtained pulp chips (108 g), 4.5 g (0.2 mol per one mole of AGU) of powdery sodium hydroxide, and 4.9 g of deionized water were mixed in a mortar. The resultant mixture was introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section and decrystallized for 60 min under conditions of frequency: 20 Hz, total amplitude: 8 mm, and temperature: 30° C. or lower, to obtain 117 g of a powdery mixture of cellulose and sodium hydroxide (water content: 12.8% based on cellulose, average degree of polymerization: 1450, crystallinity: 54%).

Step 4

The powdery mixture (117 g) obtained in step 3 and 21.5 g (0.2 mol per one mole of AGU) of GMAC used in Example 1 were introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section and decrystallized for 12 min under conditions of frequency: 20 Hz, total amplitude: 8 mm, and temperature: 30° C. or lower, to obtain 138 g of a powdery mixture of C-Cell, GMAC, and sodium hydroxide (water content: 18.7% based on cellulose, average degree of polymerization: 1400, crystallinity: 43%).

Aging

The obtained powdery mixture (100 g) and 24.8 g (0.3 mol per one mole of AGU) of GMAC used in Example 1 were mixed in a mortar. The obtained mixture (water content: 34.8% based on cellulose) was introduced into a kneader and aged at 50° C. for 5 h. The aged product (10 g) was desalted and purified by neutralizing with acetic acid and washing with three portions of 100 ml of a 85% aqueous solution of isopropyl alcohol, and then vacuum-dried, to obtain 7 g of C-Cell (average degree of polymerization: 1400, crystallinity: 43%).

From the results of analysis, the calculated degree of substitution with cationic group was 0.3. The content of water solubles was 62%. The results are shown in Table 2.

Comparative Example 1

In the same manner as in Example 1, a sheet-form wood pulp (manufactured by Tembec, average degree of polymerization: 1770, crystallinity: 74%, water content: 7.6%) was made into chips by a sheet pelletizer, which were then dried at 80° C. under reduced pressure for 12 h to obtain dried pulp chips (water content: 0.4%).

The obtained dried pulp chips (100 g) was introduced into a batch vibration mill (tradename "ME-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section and decrystallized for 60 min under conditions of frequency: 20 Hz, total amplitude: 8 mm, and temperature: 30 to 70° C., to obtain a powdery cellulose having an average degree of polymerization of 630 and a crystallinity of zero.

The obtained powdery cellulose (5 g) and 1.5 g of a 16% aqueous solution of sodium hydroxide (0.2 mol per one mole of AGU) were mixed in a mortar. The mixture was further mixed with 1.17 g (0.2 mol per one mole of AGU) of GMAC used in Example 1 in the mortar. The resultant mixture (water content: 30% based on cellulose) was introduced into a screw tube and aged at 50° C. for 5 h. The aged product was desalted and purified by neutralizing with acetic acid and washing with three portions of 100 ml of a 85% aqueous solution of isopropyl alcohol, and then vacuum-dried, to obtain 4 g C-Cell (average degree of polymerization: 630, crystallinity: zero).

From the results of analysis, the calculated degree of substitution with cationic group was 0.1. The content of water solubles was 15%. The results are shown in Table 1.

Comparative Example 2

The powdery cellulose (5 g) obtained in the decrystallization of Comparative Example 1 and 1.3 g (0.2 mol of per one mole of AGU) of a 19% aqueous solution of sodium hydroxide were mixed in a mortar and the mixture was further mixed with 2.33 g (0.4 mol per one mole of AGU) of GMAC used in Example 1 in the mortar. The obtained mixture (water content: 30% based on cellulose) was introduced into a screw tube and aged at 50° C. for 5 h. The aged product was desalted and purified by neutralizing with acetic acid and washing with three portions of 100 ml of a 85% aqueous solution of isopropyl alcohol, and then vacuum-dried, to obtain 4 g C-Cell (average degree of polymerization: 630, crystallinity: zero).

From the results of analysis, the calculated degree of substitution with cationic group was 0.3. The content of water solubles was 48%. The results are shown in Table 1.

Comparative Example 3

In the same manner as in Example 1, a sheet-form wood pulp (manufactured by Tembec, average degree of polymerization: 1770, crystallinity: 74%, water content: 7.6%) was made into chips by a sheet pelletizer Step 1

The obtained pulp chips (138 g) were mixed with 17 g of deionized water in a mortar. The mixture was introduced into a batch vibration mill (tradename "MB-1" manufactured by Chuo Kakohki Co., Ltd.) having a total tank volume of 3.5 L and containing 13 pieces of SUS304 rods (filling rate: 57%) with 30 mmϕ, 218 mm length, and a circular cross-section and decrystallized for 12 min under conditions of frequency: 20 Hz, total amplitude: 8 mm, and temperature: 30° C. or lower, to obtain 155 g of a powdery cellulose (water content: 21.2% based on cellulose) having an average degree of polymerization of 1360 and a crystallinity of 64%.

Step 2

The obtained powdery cellulose (155 g) and 22.4 g of a 11% aqueous solution of sodium hydroxide (0.1 mol per one mole of AGU) were mixed in a mortar. The obtained mixture was introduced into a batch vibration mill (tradename "MB-1" manufactured by Chuo Kakohki Co., Ltd.) having a total tank volume of 3.5 L and containing 117 pieces of SUS304 rods (filling rate: 57%) with 10 mmϕ, 218 mm length, and a circular cross-section and decrystallized for 60 min under conditions of frequency: 20 Hz, total amplitude: 8 mm, and temperature: 30° C. or lower, to obtain 177 g of a powdery mixture of cellulose and sodium hydroxide (water content: 37.2% based on cellulose, average degree of polymerization: 1170, crystallinity: 64%).

Aging

The obtained powdery mixture (7 g) was mixed with 3 g (0.5 mol per one mole of AGU) of GMAC used in Example 1. The obtained mixture (water content: 48.9% based on cellulose) was introduced into a screw tube and aged at 50° C. for 5 h. The aged product was desalted and purified by neutralizing with acetic acid and washing with three portions of 100 ml of a 85% aqueous solution of isopropyl alcohol, and then vacuum-dried, to obtain 7 g C-Cell (average degree of polymerization: 1170, crystallinity: 64%).

From the results of analysis, the calculated degree of substitution with cationic group was 0.3. The content of water solubles was 17%. The results are shown in Table 1.

TABLE 1

| | Examples | | | | |
|---|---|---|---|---|---|
| | 1 | 2 | 3 | 4 | 5 |
| Cellulose Raw Material | | | | | |
| Average degree of polymerization | 1770 | 1770 | 1770 | 1770 | 1770 |
| Crystallinity (%) | 74 | 74 | 74 | 74 | 74 |
| Step 1 | | | | | |
| GMAC added (mol/1 mol AGU) | 0.2 | 0.2 | 0.2 | 0.1 | 0.5 |
| Decrystallization conditions* | A | A | A | A | B |
| At completion of step 1 | | | | | |
| average degree of polymerization | 1350 | 1350 | 1350 | 1330 | 1300 |
| crystallinity (%) | 68 | 68 | 68 | 68 | 61 |
| Reduction ($P^1$) in crystallinity (%) | 6 | 6 | 6 | 6 | 13 |
| Step 2 | | | | | |
| Basic compound | NaOH | NaOH | KOH | NaOH | NaOH |
| Basic compound added (mol/1 mol AGU) | 0.2 | 0.2 | 0.2 | 0.1 | 0.2 |
| Polyalkylene glycol (PG) | — | — | — | — | — |
| PG added (% by mass/cellulose raw material) | — | — | — | — | — |
| Decrystallization conditions* | F | F | F | F | B |

TABLE 1-continued

| At completion of step 2 | | | | | |
|---|---|---|---|---|---|
| Average degree of polymerization | 1330 | 1330 | 1120 | 1020 | 1240 |
| Crystallinity (%) | 45 | 45 | 48 | 41 | 38 |
| Reduction ($P^2$) in crystallinity (%) | 23 | 23 | 20 | 27 | 23 |
| Aging | | | | | |
| Basic compound | — | — | — | — | — |
| Basic compound added (mol/1 mol AGU) | — | — | — | — | — |
| GMAC added (mol/1 mol AGU) | — | 0.3 | 0.3 | 0.4 | — |
| Temperature (° C.) | 50 | 50 | 50 | 50 | — |
| Time (h) | 5 | 5 | 5 | 5 | — |
| C-Cell | | | | | |
| Average degree of polymerization | 1330 | 1330 | 1120 | 1020 | 1240 |
| Degree of substitution with cationic group (mol/1 mol AGU) | 0.1 | 0.3 | 0.3 | 0.3 | 0.3 |
| Content of water solubles (%) | 31 | 100 | 84 | 93 | 98 |

*A: 30-mmφ rods, 12-min treatment. B: 30-mmφ rods, 60-min treatment. F: 10-mmφ rods, 60-min treatment.

|  | Examples | | | | |
|---|---|---|---|---|---|
|  | 6 | 7 | 8 | 9 | 10** |
| Cellulose Raw Material | | | | | |
| Average degree of polymerization | 1770 | 1770 | 1770 | 1770 | 1770 |
| Crystallinity (%) | 74 | 74 | 74 | 74 | 74 |
| Step 1 | | | | | |
| GMAC added (mol/1 mol AGU) | 0.5 | 0.5 | 0.5 | 0.5 | 0.5 |
| Decrystallization conditions* | B | B | A | A | A |
| At completion of step 1 | | | | | |
| average degree of polymerization | 1300 | 1300 | 1350 | 1350 | 1350 |
| crystallinity (%) | 61 | 61 | 68 | 68 | 68 |
| Reduction ($P^1$) in crystallinity (%) | 13 | 13 | 6 | 6 | 6 |
| Step 2 | | | | | |
| Basic compound | NaOH | NaOH | NaOH | NaOH | NaOH |
| Basic compound added (mol/1 mol AGU) | 0.4 | 0.6 | 0.4 | 0.4 | 0.4 |
| Polyalkylene glycol (PG) | — | — | PEG 600 | PEG 4000 | PPG 1000 |
| PG added (% by mass/cellulose raw material) | — | — | 10 | 10 | 10 |
| Decrystallization conditions* | C | C | D | D | E |
| At completion of step 2 | | | | | |
| Average degree of polymerization | 860 | 809 | 1006 | 1061 | 829 |
| Crystallinity (%) | 14 | 9 | 22 | 30 | 14 |
| Reduction ($P^2$) in crystallinity (%) | 47 | 52 | 46 | 38 | 54 |
| Aging | | | | | |
| Basic compound | — | — | — | — | — |
| Basic compound added (mol/1 mol AGU) | — | — | — | — | — |
| GMAC added (mol/1 mol AGU) | — | — | — | — | — |
| Temperature (° C.) | — | — | — | — | — |
| Time (h) | — | — | — | — | — |
| C-Cell | | | | | |
| Average degree of polymerization | 860 | 809 | 1006 | 1061 | 829 |
| Degree of substitution with cationic group (mol/1 mol AGU) | 0.3 | 0.3 | 0.3 | 0.3 | 0.2 |
| Content of water solubles (%) | 93 | 81 | 81 | 79 | 81 |

*A: 30-mmφ rods, 12-min treatment. B: 30-mmφ rods, 60-min treatment. C: 30-mmφ rods, 120-min treatment. D: 30-mmφ rods, 140-min treatment. E: 30-mmφ rods, 180-min treatment.
**Apparatus for decrystallization: FV-20

|  | Comparative Examples | | |
|---|---|---|---|
|  | 1 | 2 | 3 |
| Cellulose Raw Material | | | |
| Average degree of polymerization | 630 | 630 | 1770 |
| Crystallinity (%) | 0 | 0 | 74 |
| Step 1 | | | |
| GMAC added (mol/1 mol AGU) | — | — | — |
| Decrystallization conditions* | — | — | A |
| At completion of step 1 | | | |
| average degree of polymerization | — | — | 1360 |
| crystallinity (%) | — | — | 64 |
| Reduction ($P^1$) in crystallinity (%) | — | — | 10 |
| Step 2 | | | |
| Basic compound | — | — | NaOH |
| Basic compound added (mol/1 mol AGU) | — | — | 0.1 |
| Polyalkylene glycol (PG) | — | — | — |
| PG added (% by mass/cellulose raw material) | — | — | — |
| Decrystallization conditions* | — | — | F |
| At completion of step 2 | | | |
| Average degree of polymerization | — | — | 1170 |
| Crystallinity (%) | — | — | 64 |
| Reduction ($P^2$) in crystallinity (%) | — | — | 0 |
| Aging | | | |
| Basic compound | NaOH | NaOH | — |
| Basic compound added (mol/1 mol AGU) | 0.2 | 0.2 | — |
| GMAC added (mol/1 mol AGU) | 0.2 | 0.4 | 0.5 |
| Temperature (° C.) | 50 | 50 | 50 |
| Time (h) | 5 | 5 | 5 |
| C-Cell | | | |
| Average degree of polymerization | 630 | 630 | 1170 |
| Degree of substitution with cationic group (mol/1 mol AGU) | 0.1 | 0.3 | 0.3 |
| Content of water solubles (%) | 15 | 48 | 17 |

*A: 30-mmφ rods, 12-min treatment. F: 10-mmφ rods, 60-min treatment.

TABLE 2

|  | Examples | |
|---|---|---|
|  | 11 | 12 |
| Cellulose Raw Material | | |
| Average degree of polymerization | 1770 | 1770 |
| Crystallinity (%) | 74 | 74 |
| Step 3 | | |
| Basic compound | NaOH | NaOH |
| Basic compound added (mol/1 mol AGU) | 0.2 | 0.2 |
| Decrystallization conditions* | A | B |

TABLE 2-continued

| | Examples | |
|---|---|---|
| | 11 | 12 |
| At completion of step 3 | | |
| average degree of polymerization | 1500 | 1450 |
| crystallinity (%) | 60 | 54 |
| Reduction ($P^3$) in crystallinity (%) | 14 | 20 |
| Step 4 | | |
| GMAC added (mol/1 mol AGU) | 0.2 | 0.2 |
| Decrystallization conditions* | B | A |
| At completion of step 4 | | |
| Average degree of polymerization | 1100 | 1400 |
| Crystallinity (%) | 38 | 43 |
| Reduction ($P^4$) in crystallinity (%) | 22 | 11 |
| Aging | | |
| Basic compound | — | — |
| Basic compound added (mol/1 mol AGU) | — | — |
| GMAC added (mol/1 mol AGU) | 0.3 | 0.3 |
| Temperature (° C.) | 50 | 50 |
| Time (h) | 5 | 5 |
| C-Cell | | |
| Average degree of polymerization | 1100 | 1400 |
| Degree of substitution with cationic group (mol/1 mol AGU) | 0.3 | 0.3 |
| Content of water solubles (%) | 81 | 62 |

*A: 30-mmϕ rods, 12-min treatment. B: 30-mmϕ rods, 60-min treatment.

Upon comparing Example 1 with Comparative Example 1 and comparing Examples 2 to 9 with Comparative Example 2, it can be seen that C-Cell obtained by the method of first embodiment of the invention has a high average degree of polymerization and a high water solubility as compared with C-Cell obtained from a cellulose raw material having a crystallinity of zero, even when the degree of substitution with cationic group is equivalent.

Comparative Example 3 shows that C-Cell obtained by the decrystallization without adding GMAC in step 1 had an extremely decreased content of water solubles, even when the average degree of polymerization and the degree of substitution with cationic group are equivalent, demonstrating that the production method of the invention is excellent for the production of C-Cell having a high degree of polymerization and a high water-solubility.

Example 13

Production of C-HPC

Into a kneader, 98.6 g of C-Cell (not neutralized and purified) obtained in Example 2 by aging was introduce. The kneader was heated to 70° C. and 51.9 g (3 mol per one mole of AGU) of propylene oxide (guaranteed reagent manufactured by Kanto Chemical Co., Inc.) was added dropwise. The reaction was allowed to proceed for 20 h until the propylene oxide was consumed and the reflux was finished.

The product was withdrawn from the kneader to obtain 125 g of a pale brown, crude C-HPC powder. The product (10.0 g) was neutralized with acetic acid to obtain a pale brown solid. The obtained solid was purified through a dialysis membrane (molecular weight cut-off of 1000) and freeze-dried to obtain purified C-HPC.

From the results of analysis, the calculated degrees of substitution with cationic group and propyleneoxy group were 0.3 and 1.3, respectively. The content of water solubles of the obtained C-HPC was 64%. The results are shown in Table 3.

Example 14

Production of C-HPC

The addition reaction of propylene oxide was conducted in the same manner as in Example 13 except for using C-Cell (not neutralized and purified) obtained in Example 3 by aging as the starting material. The degrees of substitution with cationic group and propyleneoxy group of the obtained C-HPC were 0.3 and 1.9, respectively. The content of water solubles of the obtained C-HPC was 61%. The results are shown in Table 3.

Example 15

Production of C-HPC

The addition reaction of propylene oxide was conducted in the same manner as in Example 13 except for using C-Cell (not neutralized and purified) obtained in step 2 of Example 5 as the starting material and using 34.6 g (2 mol per one mole of AGU) of propylene oxide. The degrees of substitution with cationic group and propyleneoxy group of the obtained C-HPC were 0.3 and 1.1, respectively. The content of water solubles of the obtained C-HPC was 65%. The results are shown in Table 3.

Example 16

Production of C-HPC

The addition reaction of propylene oxide was conducted in the same manner as in Example 15 except for using C-Cell (not neutralized and purified) obtained in step 2 of Example 6 as the starting material. The degrees of substitution with cationic group and propyleneoxy group of the obtained C-HPC were 0.3 and 1.6, respectively. The content of water solubles of the obtained C-HPC was 82%. The results are shown in Table 3.

Example 17

Production of C-HPC

The addition reaction of propylene oxide was conducted in the same manner as in Example 13 except for using C-Cell (not neutralized and purified) obtained in Example 1 by aging as the starting material and using 103.8 g (6 mol per one mole of AGU) of propylene oxide. The degrees of substitution with cationic group and propyleneoxy group of the obtained C-HPC were 0.1 and 2.9, respectively. The content of water solubles of the obtained C-HPC was 71%. The results are shown in Table 3.

Example 18

Production of C-HPC

The addition reaction of propylene oxide was conducted in the same manner as in Example 13 except for using C-Cell (not neutralized and purified) obtained in step 2 of Example 10 as the starting material and using 26 g (1.5 mol per one mole of AGU) of propylene oxide. The degrees of substitution with cationic group and propyleneoxy group of the obtained C-HPC were 0.2 and 1.19, respectively. The content of water solubles of the obtained C-HPC was 75%. The results are shown in Table 3.

Comparative Example 4

Production of C-HPC

The addition reaction of propylene oxide was conducted in the same manner as in Example 17 except for using C-Cell (not neutralized and purified) obtained in Comparative Example 1 by aging as the starting material. The degrees of substitution with cationic group and propyleneoxy group of the obtained C-HPC were 0.1 and 2.8, respectively. The content of water solubles of the obtained C-HPC was 48%. The results are shown in Table 3.

TABLE 3

|  | Examples | | |
|---|---|---|---|
|  | 13 | 14 | 15 |
| Raw Material |  |  |  |
| C-Cell* | Ex. 2 after aging | Ex. 3 after aging | Ex. 5 after step 2 |
| Average degree of polymerization | 1330 | 1120 | 1240 |
| Degree of substitution with cationic group (mol/1 mol AGU) | 0.3 | 0.3 | 0.3 |
| Propylene Oxide Charged (mol/1 mol AGU) | 3.0 | 3.0 | 2.0 |
| C-HPC |  |  |  |
| Degree of substitution with propyleneoxy group (mol/1 mol AGU) | 1.3 | 1.9 | 1.1 |
| Content of water solubles (%) | 64 | 61 | 65 |

|  | Examples | | |
|---|---|---|---|
|  | 16 | 17 | 18 |
| Raw Material |  |  |  |
| C-Cell* | Ex. 6 after step 2 | Ex. 1 after aging | Ex. 10 after step 2 |
| Average degree of polymerization | 860 | 1330 | 829 |
| Degree of substitution with cationic group (mol/1 mol AGU) | 0.3 | 0.1 | 0.2 |
| Propylene Oxide Charged (mol/1 mol AGU) | 2.0 | 6.0 | 3.0 |
| C-HPC |  |  |  |
| Degree of substitution with propyleneoxy group (mol/1 mol AGU) | 1.6 | 2.9 | 1.2 |
| Content of water solubles (%) | 82 | 71 | 75 |

|  | Comparative Example 4 |
|---|---|
| Raw Material |  |
| C-Cell* | Comp. Ex. 1 after aging |
| Average degree of polymerization | 630 |
| Degree of substitution with cationic group (mol/1 mol AGU) | 0.1 |
| Propylene Oxide Charged (mol/1 mol AGU) | 5.0 |
| C-HPC |  |
| Degree of substitution with propyleneoxy group (mol/1 mol AGU) | 2.8 |
| Content of water solubles (%) | 48 |

*Basic compounds used were all not neutralized and washed.

As seen from Table 3, C-HPC obtained in Examples 13 to 18 had a high degree of polymerization and a high water solubility.

INDUSTRIAL APPLICABILITY

According to the present invention, C-Cell and C-HAC having a high water-solubility are produced while preventing the depolymerization of cellulose.

C-Cell and C-HAC obtained by the present invention are suitably applicable to dispersants, modifiers, aggregating agents, etc.

What is claimed is:

1. A method of producing a cationized cellulose, the method comprising:

first, adding a cationizing agent represented by formula (1):

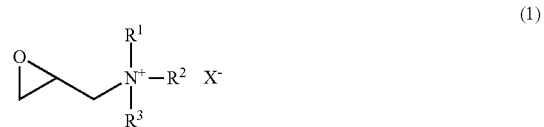

wherein each of $R^1$ to $R^3$ is independently a hydrocarbon group having 1 to 3 carbon atoms and $X^-$ is an anionic atom or group,
to a cellulose and mechanically decrystallizing the cellulose with a tank-drive media mill such that a reduction ($P^1$) in crystallinity from said first adding is represented by calculation formula (1):

$P^1$=crystallinity (%) of cellulose before starting said first adding−crystallinity (%) of cellulose after completing said first adding (1)

reaches 1 to 60%, thereby obtaining a mixture, and
second, adding a basic compound to the mixture obtained from said first adding in an amount of 0.01 to 1 equiv per one mole of anhydroglucose unit of the cellulose in the mixture and mechanically decrystallizing the cellulose with a tank-drive media mill such that a reduction ($P^2$) in crystallinity from said second adding is represented by calculation formula (2):

$P^2$=crystallinity (%) of cellulose before starting said second adding−crystallinity (%) of cationized cellulose after completing said second adding (2)

reaches 1 to 80%,
wherein the cellulose is allowed to react with a cationizing agent represented by formula (1) during said second adding.

2. The method according to claim 1, wherein the mechanical decrystallization carried out in at least one of said first adding and said second adding is conducted in the presence of water in an amount of 5 to 50% by mass of the cellulose present during said first adding.

3. The method according to claim 1, wherein the mechanical decrystallization carried out in at least one of said first adding and said second adding is conducted in the presence of a polyether.

4. The method according to claim 1, further comprising aging a reaction mixture obtained through said first adding and second adding at 20 to 200° C.

5. The method according to claim 4, wherein the aging is conducted in the presence of water in an amount of 5 to 100% by mass of the cellulose present during said first adding.

6. The method according to claim 4, wherein the aging is conducted for 0.1 to 72 h.

7. The method according to claim 1, wherein a content of water solubles in the cationized cellulose is at least 31%, and wherein an average degree of polymerization in the cationized cellulose is at least 809.

8. The method according to claim 1, wherein, during adding the cationizing agent to the cellulose, the cellulose has an average degree of polymerization of from 1000 to 3000.

9. A method of producing a cationized cellulose, the method comprising:

first, adding a basic compound to a cellulose in an amount of 0.01 to 1 equiv per one mole of anhydroglucose unit of the cellulose and mechanically decrystallizing the cellulose with a tank-drive media mill such that a reduction (P³) in crystallinity from said first adding is represented by calculation formula (3):

$P^3$=crystallinity (%) of cellulose before starting said first adding−crystallinity (%) of cellulose after completing said first adding (3)

reaches 1 to 60%, thereby obtaining a mixture, and
second, adding a cationizing agent represented by formula (1):

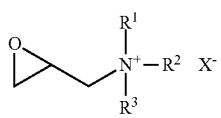

wherein each of $R^1$ to $R^3$ is independently a hydrocarbon group having 1 to 3 carbon atoms and $X^-$ is an anionic atom or group,
to the mixture obtained from said first adding and mechanically decrystallizing the cellulose with a tank-drive media mill such that a reduction (P⁴) in crystallinity from said second adding represented by calculation formula (4):

$P^4$=crystallinity (%) of cellulose before starting said second adding−crystallinity (%) of cationized cellulose after completing said second adding (4)

reaches 1 to 80%,
wherein the cellulose is allowed to react with a cationizing agent represented by formula (1) during said second adding.

10. The method according to claim 9, wherein the mechanical decrystallization of at least one of said first adding and said second adding is conducted in the presence of water in an amount of 5 to 50% by mass of the cellulose present during said first adding.

11. The method according to claim 9, wherein the mechanical decrystallization carried out in at least one of said first adding and said second adding is conducted in the presence of a polyether.

12. The method according to claim 9, further comprising aging a reaction mixture obtained through said first adding and said second adding at 20 to 200° C.

13. The method according to claim 12, wherein the aging is conducted in the presence of water in an amount of 5 to 100% by mass of the cellulose present during said first adding.

14. The method according to claim 12, wherein the aging is conducted for 0.1 to 72 h.

15. The method according to claim 9, wherein a content of water solubles in the cationized cellulose is at least 31%, and wherein an average degree of polymerization in the cationized cellulose is at least 809.

16. The method according to claim 9, wherein, during adding the basic compound to the cellulose, the cellulose has an average degree of polymerization of from 1000 to 3000.

17. A method of producing a cationized hydroxyalkylcellulose, the method comprising:

first, adding a cationizing agent represented by formula (1):

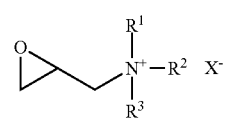

wherein each of $R^1$ to $R^3$ is independently a hydrocarbon group having 1 to 3 carbon atoms and $X^-$ is an anionic atom or group,
to a cellulose and mechanically decrystallizing the cellulose with a tank-drive media mill such that a reduction (P¹) in crystallinity from said first adding is represented by calculation formula (1):

$P^1$=crystallinity (%) of cellulose before starting said first adding−crystallinity (%) of cellulose after completing said first adding (1)

reaches 1 to 60%, thereby obtaining a mixture,
second, adding a basic compound to the mixture obtained from said first adding in an amount of 0.01 to 1 equiv per one mole of anhydroglucose unit of the cellulose in the mixture and mechanically decrystallizing the cellulose with a tank-drive media mill such that a reduction (P²) in crystallinity from said second adding represented by calculation formula (2):

$P^2$=crystallinity (%) of cellulose before starting said second adding−crystallinity (%) of cationized cellulose after completing said second adding (2)

reaches 1 to 80%, thereby producing a cationized cellulose; and
reacting the cationized cellulose with an alkylene oxide having from 2 to 4 carbon atoms,
wherein the cellulose is allowed to react with a cationizing agent represented by formula (1) during said second adding.

18. A method of producing a cationized hydroxyalkylcellulose, the method comprising:

first, adding a basic compound to a cellulose in an amount of 0.01 to 1 equiv per one mole of anhydroglucose unit of the cellulose and mechanically decrystallizing the cellulose with a tank-drive media mill such that a reduction (P³) in crystallinity from the first adding represented by calculation formula (3):

$P^3$=crystallinity (%) of cellulose before starting said first adding−crystallinity (%) of cellulose after completing said first adding (3)

reaches 1 to 60%, thereby obtaining a mixture, and
second, adding a cationizing agent represented by formula (1):

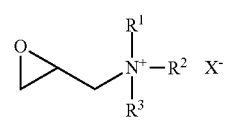

wherein each of $R^1$ to $R^3$ is independently a hydrocarbon group having 1 to 3 carbon atoms and $X^-$ is an anionic atom or group,
to the mixture obtained from said first adding and mechanically decrystallizing the cellulose with a tank-drive media mill such that a reduction ($P^4$) in crystallinity from said second adding is represented by calculation formula (4):

$$P^4 = \text{crystallinity (\%) of cellulose before starting said second adding} - \text{crystallinity (\%) of cationized cellulose after completing said second adding} \quad (4)$$

reaches 1 to 80%, thereby producing a cationized cellulose; and reacting the cationized cellulose with an alkylene oxide having from 2 to 4 carbon atoms, wherein the cellulose is allowed to react with a cationizing agent represented by formula (1) during said second adding.

* * * * *